United States Patent
McCallum

(10) Patent No.: US 11,029,929 B2
(45) Date of Patent: Jun. 8, 2021

(54) USING EMULATION TO IMPROVE STARTUP TIME FOR JUST-IN-TIME COMPILATION

(71) Applicant: Red Hat, Inc., Raleigh, NC (US)

(72) Inventor: Nathaniel Philip McCallum, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/256,592

(22) Filed: Jan. 24, 2019

(65) Prior Publication Data
US 2020/0241855 A1    Jul. 30, 2020

(51) Int. Cl.
*G06F 8/41* (2018.01)
*G06F 9/30* (2018.01)
*G06F 9/455* (2018.01)

(52) U.S. Cl.
CPC .......... *G06F 8/434* (2013.01); *G06F 9/3005* (2013.01); *G06F 9/4552* (2013.01); *G06F 9/45508* (2013.01)

(58) Field of Classification Search
CPC . G06F 8/40–51; G06F 9/3005; G06F 9/45508
USPC ................................. 717/134–161
See application file for complete search history.

(56) References Cited

U.S. PATENT DOCUMENTS

| | | | | | |
|---|---|---|---|---|---|
| 5,933,635 | A * | 8/1999 | Holzle | ................... | G06F 8/443 717/151 |
| 5,970,249 | A * | 10/1999 | Holzle | ................ | G06F 9/45516 717/153 |
| 7,124,407 | B1 * | 10/2006 | Wallman | ............. | G06F 9/45504 717/154 |
| 7,665,079 | B1 * | 2/2010 | Yasue | ................ | G06F 9/45516 717/160 |
| 8,677,329 | B2 * | 3/2014 | Beretta | ................ | G06F 9/5055 717/140 |
| 8,875,114 | B2 * | 10/2014 | Bohizic | ............... | G06F 12/0875 717/151 |

(Continued)

OTHER PUBLICATIONS

Debbabi, M., et al., A Synergy Between Efficient Interpretation and Fast Selective Dynamic Compilation for the Acceleration of Embedded JVMs, PPPJ '04, Jun. 2004, pp. 107-113, [retrieved on Jan. 30, 2021], Retrieved from the Internet: <URL:http://dl.acm.org/>.*

(Continued)

*Primary Examiner* — Geoffrey R St Leger
(74) *Attorney, Agent, or Firm* — K&L Gates LLP

(57) ABSTRACT

A system and method are provided for emulating a code sequence while compiling the code sequence into compiled operations for later execution of the code sequence. In one embodiment, the system includes an emulation model for executing operations and a compilation model for compiling operations. The emulation model may execute operations of the code sequence and the compilation model may compile the operations of the code sequence into compiled operations. The system may transfer execution of the operations from the emulation model to the compiled operations. In certain implementations, the transfer may include transferring flow information and program execution information. In further implementations, the transfer may occur after detecting that a current compilation level of the code sequence exceeds a compilation threshold.

20 Claims, 13 Drawing Sheets

(56) References Cited

U.S. PATENT DOCUMENTS

| | | | | |
|---|---|---|---|---|
| 10,268,462 B2* | 4/2019 | Kunugi | ............ | G06F 8/434 |
| 10,303,498 B2* | 5/2019 | Tzen | ............ | G06F 9/455 |
| 2009/0083720 A1* | 3/2009 | Bohizic | ............ | G06F 9/45504 |
| | | | | 717/140 |
| 2009/0271799 A1 | 10/2009 | Barsness et al. | | |
| 2010/0313079 A1* | 12/2010 | Beretta | ............ | G06F 9/5055 |
| | | | | 714/48 |
| 2017/0097835 A1* | 4/2017 | Tzen | ............ | G06F 9/455 |
| 2018/0052667 A1* | 2/2018 | Kunugi | ............ | G06F 8/434 |

OTHER PUBLICATIONS

Zheng, W., et al., A Java Virtual Machine Design Based on Hybrid Concurrent Compilation Model, Proceedings 36th International Conference on Technology of Object-Oriented Languages and Systems, Oct. 30-Nov. 4, 2000, pp. 18-23, [retrieved on Jan. 30, 2021], Retrieved from the Internet: <URL:http://ieeexplore.IEEE.org/>.*

Filip Pizlo, Introducing the WebKit FTL JIT; https://webkit.org/blog/3362/introducing-the-webkit-ftl-jit/; published May 13, 2014; retrieved Sep. 28, 2018; (31 pages).

Brandon Bray; Visual Studio: An easy solution for improving app launch performance; https://blogs.msdn.microsoft.com/dotnet/2012/10/18/an-easy-solution-for-improving-app-launch-performance/; published Oct. 18, 2012; retrieved Sep. 28, 2018; (15 pages).

Hans Wennborg; Emulator Speed-up Using JIT and LLVM; Lund University Master's Thesis; Jan. 2010; (71 pages).

Becker, et al.; Just-in-time Compilation for FPGA Processor Cores; University of California; Jul. 14, 2011; (6 pages).

* cited by examiner

USING EMULATION TO IMPROVE STARTUP TIME FOR JUST-IN-TIME COMPILATION

BACKGROUND

Computer processors are unable to execute programming operations (e.g., computer code) written in most programming languages (e.g., Java, Javascript, WebAssembly). These programming languages typically store such programming operations as bytecode, which must be translated into executable instructions that can be performed by a processor. This translation therefore must occur before the programing operations can be executed.

SUMMARY

The present disclosure presents new and innovative systems and methods for improving startup time using emulation. In one example, a system is provided comprising a processor implementing a plurality of execution models including (i) an emulation model for executing operations and (ii) a compilation model for compiling operations and a memory. The memory may contain instructions which, when executed by the processor, cause the processor to receive a code sequence containing operations for performance by the system, execute the operations of the code sequence using the emulation model, and compile the operations of the code sequence into compiled operations using the compilation model. The memory may contain additional instructions which, when executed by the processor, cause the processor to transfer execution of the operations from the emulation model to the compiled operations and execute the compiled operations.

In another example, the memory contains further instruction which, when executed by the processor, cause the processor to detect that a current compilation level of the code sequence exceeds a compilation threshold of the code sequence.

In yet another example, the compilation threshold represents a percentage of operations of the code sequence to be compiled into compiled operations before transferring execution of the operations from the emulation model to the compiled operations.

In a further example, the operations include one or more functions and the compilation threshold includes operations representing one or both of (i) functions performed frequently during execution of the code sequence, (ii) functions performed frequently by previously-compiled code sequences performed by the system, and (iii) functions required to initiate a service provided by the system.

In another example, the memory contains further instructions which, when executed by the processor, cause the processor to determine an execution frequency for one or more functions of the code sequence, calculate an execution frequency threshold, identify as frequent functions of the code sequence the functions with execution frequencies that exceed the execution frequency threshold, and generate the compilation threshold to include the operations corresponding to the frequent functions.

In yet another example, the emulation model is further configured to transfer flow information from the emulation model to the compiled operations.

In a further example, the flow information includes an emulation instruction pointer of the emulation model.

In another example, the flow information is stored in an instruction register of the processor after being transferred to the compiled operations.

In yet another example, the system is further configured to transfer execution of the operations from the emulation model to the compiled operations when the emulation model completes execution of a function of the code sequence.

In a further example, the emulation model is further configured to transfer program execution information from the emulation model to the compiled operations.

In another example, the emulation model is configured to store program execution data in an emulation stack within the memory, and wherein the emulation stack pointer indicates a location of the emulation stack with the memory.

In yet another example, the program execution information is stored in a stack register of the processor after being transferred to the compiled operations.

In a further example, the compiled operations are executed in a execution environment configured to detect that an operation to be executed is uncompiled and cause the compilation model to compile the operation to be executed into a compiled operation to be executed.

In another example, the memory contains further instructions which, when executed, cause the processor to continue compiling the operations using the compilation model after transferring execution of the operations from the emulation model to the compiled operations.

In yet another example the system is further configured to transfer execution of the operations from the emulation model to the compiled operations after the compilation model compiles all operations of the code sequence.

In a further example, the compilation model is a just-in-time (JIT) compilation model.

In another example, a method is provided comprising receiving a code sequence containing operations for performance by a computing system, executing the operations of the code sequence using an emulation model, and compiling the operations of the code sequence into compiled operations using a compilation model. The method may also comprise transferring execution of the operations from the emulation model to the compiled operations and executing the compiled operations.

In yet another example, a method is provided comprising executing a code sequence including operations with an emulation model, compiling operations of the code sequence into compiled operations with a compilation model, and detecting that the compiled operations exceed a compilation threshold of the code sequence. The method may further comprise transferring flow information and program execution information from the emulation model to an execution environment and executing the compiled operations within the execution environment.

In another example, the method further comprises generating an emulation instruction pointer upon completing execution of an operation with the emulation model, wherein the emulation instruction pointer includes a location storing an operation for execution. The method may further comprise translating the emulation instruction pointer into a translated instruction pointer indicating the location of the compiled operation corresponding to the next operation for execution within the memory and storing the translated instruction pointer in an instruction indicator.

In yet another example, the method further comprises generating an emulation stack pointer indicating an emulated location of an emulation stack of the emulation model within the memory, translating the emulation stack pointer into a location of the emulation stack within the memory to create a translated stack pointer, and storing the translated stack pointer in a stack indicator of a processor configured to execute the compiled operations.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

One method for translating programming operations into executable instructions is to use a compiler, such as a just-in time (JIT) compiler. However, such compilers typically require all or most of the code to be compiled for a native architecture of the processor at runtime. Fulfilling this requirement can create a significant delay between when execution of a code sequence is initiated and when the first instruction is executed by the processor.

One way to address this typical delay is to provide a processor that includes both a compilation model and an emulation environment. The compilation model may be configured to compile the operations from code sequences into compiled operations for execution by a processor. The emulation environment may be configured to sequentially emulate each instruction of a code sequence. Because the emulation environment is able to emulate each operation sequentially, the emulation environment may not need to wait for processing of each operation of the code sequence. Therefore, the emulation environment may be able to begin emulating the operations of the code sequence much quicker than a processor alone relying on the compilation model to compile the operations. However, because the emulation environment must translate each operation into one or more instructions, the emulation environment may execute each operation slower than the processor would execute a compiled operation that has been optimized for execution speed.

The methods and systems described in the present disclosure address the aforementioned problem by speeding initial execution of operations from the code sequence, when a program sequence is executed, by initially using the emulation environment to begin emulating a code sequence while the compilation model begins compiling the code sequence in parallel. When the code sequence has been sufficiently compiled, execution of the code sequence may be transferred from the emulation model to the compiled operations, which may then be executed by the processor. The system is thus able to capture the initial execution benefits of the emulation environment without having to wait for the compiler to compile the operations. Once the operations have been compiled, however, the system can also capture the absolute execution speed benefits of the compiled operations once execution is transferred to the compiled operations.

The immediate execution benefits may be particularly beneficial in applications that require immediate execution, such as when a newly-started binary needs to accept incoming socket connection. In such instances, the reduced execution performance of the emulation environment may be preferable to a delayed time to executing the first instruction over all.

Figure 1:
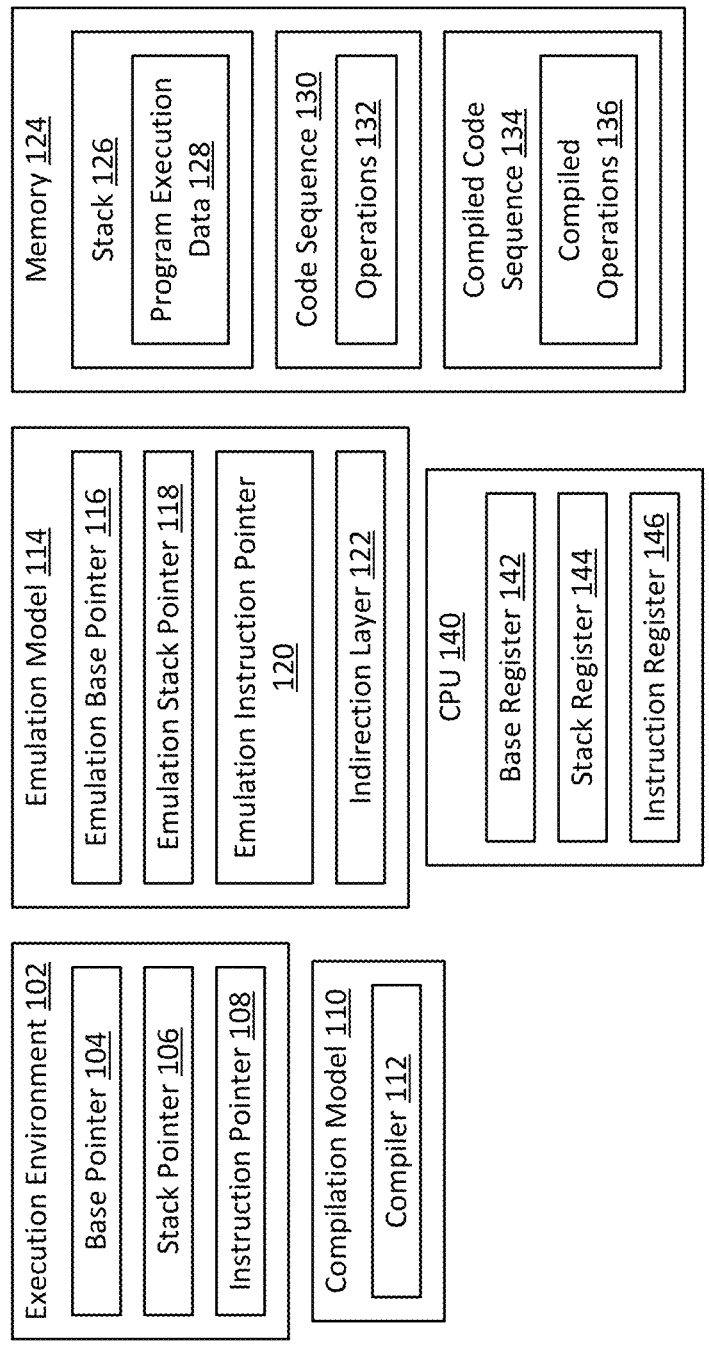
FIG. 1 illustrates a system according to an example embodiment of the present disclosure.

FIG. 1 depicts a system 100 according to an example embodiment of the present disclosure. The system 100 includes an execution environment 102, a compilation model 110, emulation model 114, a memory 124, and a CPU 140. The execution environment 102 includes a base pointer 104, a stack pointer 106, and an instruction pointer 108. The compilation model 110 includes a compiler 112. The emulation model 114 includes an emulation base pointer 116, an emulation stack pointer 118, an emulation instruction pointer 120, and an indirection layer 122. The CPU 140 includes a base register 142, a stack register 144, and an instruction register 146. In certain implementations, the base register 142, the stack register 144, and the instruction register 146 may respectively store the base pointer 104, the stack pointer 106, and the instruction pointer 108. The memory 124 stores a stack 126 including program execution data 128, a code sequence 130 including operations 132, and a compiled code sequence 134 including compiled operations 136.

The system 100 may be used to execute operations 132 stored within code sequences 130. For example, the system 100 may be used to initially emulate the operations 132 of the code sequence 130, while simultaneously compiling the operations 132 into compiled operations 136 of a compiled code sequence 134 for subsequent execution within the execution environment 102. The code sequence 130 includes multiple operations 132, which may indicate one or more computational tasks to be performed by a computer, such as the system 100. The code sequence 130 may be prepared by, e.g., a computer programmer such as a system administrator. In certain implementations one or more of the operations 132 may be organized into a plurality of functions for use when executing the code sequence 130. The code sequence 130 may be stored as bytecode.

The compiled operations 136 of the compiled code sequence 134 may represent compiled versions of the operations 132 after being compiled by a compiler 112 of the compilation model 110. The compiler 112 maybe configured to optimize the compiled code sequence 134 and the compiled operations 136 for improved execution time. For example, the compiled operations 136 may include one or more instructions for execution by a processor, such as the CPU 140. The compiler 112 may be configured to optimize the compiled operations 136 such that the compiled operations 136 include a minimum number, or a reduced number of instructions in order to improve execution speed of the compiled operations 136.

The stack 126 includes program execution data 128 for use during the execution of the code sequence 130 and the compiled code sequence 134. For example, the program execution data 128 may store variable values, execution status for one or more functions of the code sequence 130 and/or the compiled code sequence 134, and current pending function calls.

The execution environment 102 may be configured to execute compiled operations 136 and compiled code sequences 134. In implementations where a code sequence 130 is executed, the execution environment 102 may call the compilation model 110 and/or the compiler 112 to compiled code sequence 130 and the operations 132 into a compiled code sequence 134 including compiled operations 136. Once compiled, the execution environment 102 may then be able to execute the compiled code sequence 134. The execution environment 102 includes a base pointer 104, which may store an indication of the location of the base of an execution stack used by the execution environment 102. For example, the base pointer 104 may point to a location within the stack 126 of the memory 124 corresponding to the base of an execution stack used by the execution environment 102. Similarly, the execution environment 102 includes a stack pointer 106, which may store an indication of the location of the top of the execution stack used by the execution environment 102, e.g., the location within the stack 126 of the memory 124. The execution environment 102 also includes an instruction pointer 108, which may store an indication of the location of the next instruction to be executed by the execution environment 102. For example, the instruction pointer 108 may indicate a location within the memory 124 storing the next instruction to be executed. For example, if the execution environment 102 is executing a compiled operation from the compiled operations 136, the operation being executed may include a plurality of instructions stored within the memory 124. The instruction pointer 108 may then store the location of the next instruction of the plurality of instructions stored within the memory 124.

The emulation model 114 may be configured to emulate the operations 132 of the code sequence 130. In emulating the operations 132, the emulation model 114 may generate program execution data 128, stored in an emulation stack. The emulation stack may be stored on an emulation memory managed by the emulation model 114. The emulation memory may be stored within the memory 124, such as in the stack 126. The emulation base pointer 116 may store an indication of the location of the base of the emulation stack within the emulation memory. The emulation stack pointer 118 may store an indication of the location of the top of the emulation stack within the emulation memory. Notably, as will be discussed further below, the locations stored in the emulation base pointer 116 and the emulation stack pointer 118 may differ (e.g., in address) from the locations of the emulation stack relative to the memory 124 overall. The emulation instruction pointer 120 may store a location of the next instruction to be executed by the emulation model 114 within the emulation memory. For example, in executing an operation of the operations 132, the emulation model may translate the operation into a plurality of instructions, stored within the emulation memory. The emulation instruction pointer 120 may store the location of the next instruction within the emulation memory to be executed in executing the operation 132. In certain implementations, where the emulation model 114 is emulating the code sequence 130 for use on multiple types of CPU (e.g., differing CPU architectures), the emulation model 114 may include an indirection layer 122 used to redirect the emulated instructions to the appropriate CPU type. In such implementations, however, executing the code sequence 130 with the emulation model 114 may require considerably more computational time, as separate instructions may need to be translated for each of the differing CPU types.

The CPU 140 may be configured to execute one or both of the execution environment 102 and the emulation model 114. In certain implementations, the CPU 140 may implement the execution environment 102 and the emulation model 114 in parallel, and the CPU 140 may be multi-threaded. CPU 140 includes a base register 142 configured to store the base of a stack, such as the stack 126, within the memory 124. CPU 140 also includes stack register 144 configured to store the top of a stack, such as the stack 126, within the memory 124. CPU 140 also includes instruction register 146 configured to store the next instruction for execution, such as the location of the next instruction for execution within the memory 124.

The CPU 140 may be configured to execute compiled code sequences 134 using the execution environment 102. For example, the base register 142 may store the base pointer 104, the stack register 144 may store the stack pointer 106, and the instruction register 146 may store the instruction pointer 108.

The CPU 140 and the memory 124 may implement one or more of the system 100 features, such as the execution environment 102, the emulation model 114, and the compilation model 110. For example, the memory 124 may contain instruction which, when executed by the CPU 140 may perform one or more of the operational features of the execution environment 102, the emulation model 114, and the compilation model 110. Additionally, the system 100 may be implemented by a virtual machine (VM) computing system. For example, one or both of the CPU 140 and the memory 124 may be implemented by a virtual CPU and a virtual memory, respectively.

Figure 2A:
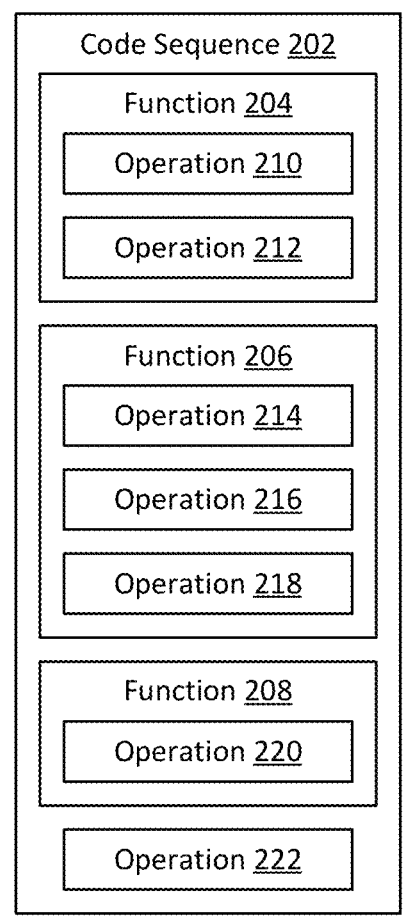
FIG. 2A illustrates a code sequence according to an example embodiment of the present disclosure.

FIG. 2A depicts a code sequence 202 according to an example embodiment of the present disclosure. The code sequence 202 may be an example of the code sequence 130 and may be prepared by, e.g., a system administrator for execution by a computing system, such as the system 100. The code sequence may be stored as, e.g., a bytecode in one or more programming languages (e.g., Java, Javascript, WebAssembly). In certain implementations, the code sequence 202 may include one or more components for which rapid execution is essential. The code sequence 202 includes multiple functions 204-208. Each of these functions 204-208 may include one or more operations 210-222. For example, the function 204 includes two operations 210, 212, the function 206 includes three operations 214, 216, 218, and function 208 has one operation 220. The code sequence 202 also includes a standalone operation 222 that is not a part of a function 204-208. Each operation may correspond to one or more tasks to be performed by a computing device (e.g., a line or lines of code written in a programming language). The functions 204-208 may correspond to one or more tasks to be performed or repeatedly called in the execution of the code sequence 202.

Figure 2B:
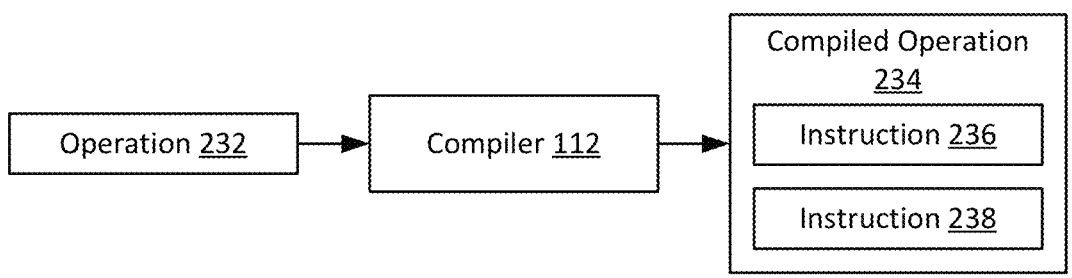
FIG. 2B illustrates an operation compilation procedure according to an example embodiment of the present disclosure.

FIG. 2B depicts an operation compilation procedure 230 according to an example embodiment of the present disclosure. The operation compilation procedure 230 may be performed to compile an operation 232 for execution by a processor, such as the CPU 140 using the execution environment 102. When compiling a code sequence 130, 202 into a compiled code sequence 134, the procedure 230 may be repeated multiple times, e.g., once per operation 232 of the code sequence 130, 202.

In the procedure 230, the operation 232 is compiled by a compiler 112 into a compiled operation 234. In compiling the operation 232, the compiler 112 may translate the operation 232 into a plurality of instructions 236, 238 corresponding to the compiled operation 234. The compiler 112 may be implemented as a JIT compiler, such as a full JIT compiler that compiles each operation 232 of a code sequence 130, 202. In other implementations, the compiler 112 may be configured as a partial JIT compiler that only compiles a subset of the operations 232 of code sequences 130, 202. In such implementations, the compiler 112 may also generate stub instructions for each of the operations 232 and/or functions 204-208 that or not compiled. When the stub instructions are called, execution of the compiled operation 234 may then proceed to the compiler 112 compiling the operation 232 or function 204-208 corresponding to the stub instruction.

In still further implementations, the compiler 112 may be implemented as a hybrid JIT compiler. The hybrid JIT compiler maybe configured to initially compile one or more operations 232 of the code sequence 130, 202 into compiled operations 234 with a minimal level of optimization. The hybrid JIT compiler may then proceed with further optimizing the compiled operations 234 for improved execution time. The initial compiled operation 234 may be quicker to compile, because less computing time is required in optimizing the compiled operation 234, but may execute slower in operation. Once optimized, the compiled operation 234 may include fewer instructions 236, 238 and may thereby execute faster than the non-optimized compile the operation. Such an implementation may be beneficial, as execution of the code sequence 130 may be transferred away from the emulation model 114 quicker, which may, in certain implementations, result in improved performance even though the initial compiled operation 234 is not optimized. In other implementations, such as the full JIT or partial JIT compilers discussed above, the compiler 112 may be implemented to optimize the compiled operation 234 while initially compiling the operations 232.

The compiled operation 234 includes multiple instructions 236, 238. The number of instructions 236, 238 included in the compiled operation may depend in part on the complexity of the operation 232 being compiled by the compiler 112. The number of instructions 236, 238 may also depend on the level of optimization performed by the compiler 112 in compiling the compiled operation 234. As discussed above, in certain implementations, the compiler 112 may optimize the compiled operation 234 such that it includes minimal or a reduced number of instructions 236, 238. In some instances, when the compiler 112 is compiling multiple operations 232 of the code sequence 132, 202, the compiler 112 may initially compile all the operations 232 and may then optimize the compiled code sequence 134 as a whole. For example, there may be one or more dependencies between the operations 232 that can be best optimized by analyzing multiple compiled operations 234 together.

The instructions 236, 238 may be stored as machine code, and the types of instructions available may depend on the architecture of the CPU 140 or in the execution environment 102. For example, the instructions 236, 238 may be selected from an instruction set that corresponds to the architecture of the CPU 140. For example, AMD® and Intel® processors have different instruction sets, so the instructions available to generate instructions 236, 238 may differ depending on the instructions that are available in the instruction set. Further, even processors in the same manufacturer have different instruction sets (e.g., the Intel® x86 instruction set and potential extensions thereto).

Figure 2C:
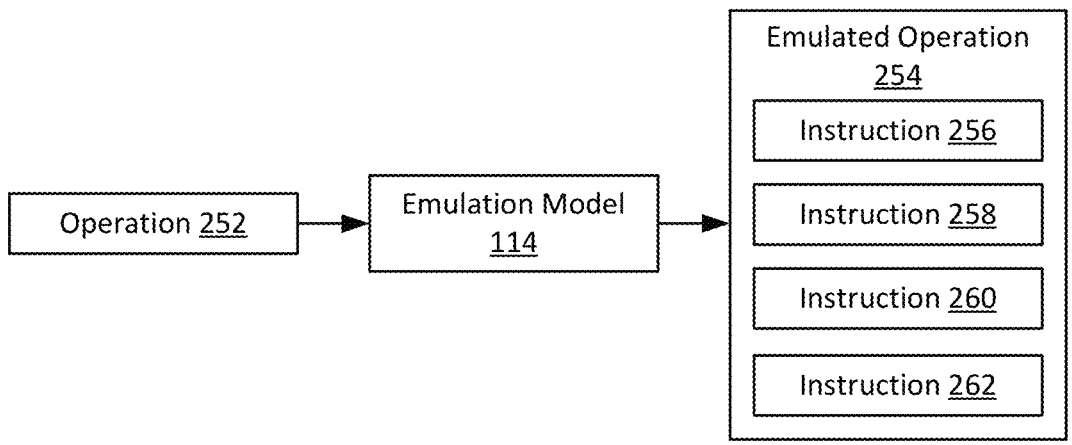
FIG. 2C illustrates an operation emulation procedure according to an example embodiment of the present disclosure.

FIG. 2C depicts an operation emulation procedure 250 according to an example embodiment of the present disclosure. The operation emulation procedure 250 may be performed by the system 100 to execute the operation 252 with the emulation model 114 without having to first compile the operation 252 into a compiled operation 136, 234. In performing the procedure 250, the system 100 may translate the operation 252, using the emulation model 114, to an emulated operation 254 that includes a plurality of instructions 256-262. In translating the operation 252 into an emulated operation 254, the emulation model 114 may use one or more heuristics to translate the operation 252 into executable instructions 256-262.

In emulating an entire code sequence 130, 202, the emulation model 114 may be configured to sequentially translate and perform each operation 252 of the code sequence 130, 202. Accordingly, in emulating a code sequence 130, 202, the emulation model 114 may perform the procedure 250 for each operation 252 that is emulated (e.g., for each operation 252 of the code sequence 130, 202 that is executed with the emulation model 114 before execution is transferred to compiled operations 136, 234). However, because of the frequent translation required, the emulation model 114 may not be optimized to quickly translate operations 252 and emulated operations 254. Therefore, emulated operations 254 may include more instructions 256-262 than corresponding compiled operations 136, 234. Accordingly, emulated operations 254 for may execute slower than the corresponding compiled operations 136, 234.

For example, suppose that the operation 232 of the procedure 230 and the operation 252 of the procedure 250 correspond the same operation of a code sequence 130, 202. As depicted in FIGS. 2B and 2C, the corresponding compiled operation 234 includes two instructions 236, 238, whereas the emulated operation 254 includes four instructions 256-262. Accordingly, when performed by a CPU 140, the compiled operation 234 may complete faster than the emulated operation 254.

Figure 3:
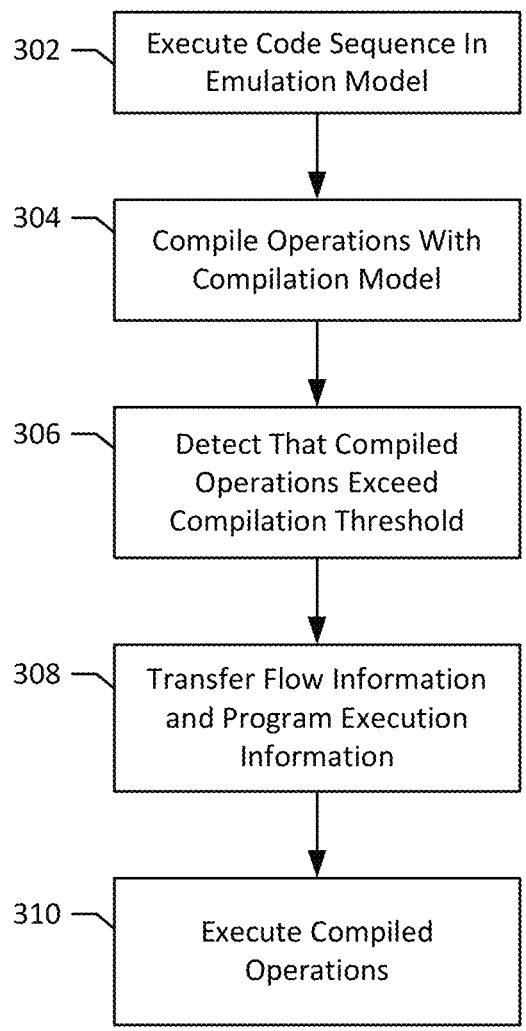
FIG. 3 illustrates a method according to an example embodiment of the present disclosure.

FIG. 3 depicts a method 300 according to an example embodiment of the present disclosure. The method 300 may be performed to improve the time to execution for a code sequence 130, 202. For example, the method 300 may be performed by the system 100 to execute a code sequence 130, 202 with an emulation model while also compiling the code sequence 130, 202 into compiled operations 136, 234 for execution. The method 300 may be implemented on a computer system, such as the system 100. For example, one or more steps of the method 300 may be implemented by the execution environment 102, the emulation model 114, and the compilation model 110. For example, all or part of the method 300 may be implemented by the CPU 140 and the memory 124. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 begins with the system executing the code sequence and the emulation model (block 302). When the system receives a code sequence 130, 202 for execution, or receives an indication of the code sequence 130, 202 to be executed (e.g., from a user or from a system administrator), the code sequence 130, 202 may be passed to the emulation model 114 for initial execution. As described above, in executing the code sequence 130, 202, the emulation model 114 may perform the procedure 250 in order to translate one or more operations 132, 210-222, 252 into an emulated operation 254 that includes one or more instructions 256-262. The instructions 256-262 may then be executed by the CPU, or a virtual CPU within the emulation model 114, in order to execute the corresponding operation 132, 210-222, 252. The emulation model 114 may then repeat the procedure 254 subsequent operations 132, 210-222, 232, 252 of the code sequence 130, 202 in order to execute the code sequence 130, 202 for as long as needed. As discussed above, in executing the code sequence 130, 202, the emulation model 114 may utilize a virtual memory, stored within the memory 124, and may store one or more items of program execution data 128 within the virtual memory.

The method 300 may then proceed with the compilation model compiling operations of the code sequence (block 304). As described above, a compiler 112 may perform the procedure 230 on one or more operations 132, 210-222, 232, 252 in order to create compiled operations 234. The compiler 112 may perform, e.g., JIT compilation and may, in certain implementations, compile only a subset or a portion of the operations 132, 210-222, 232, 252 of the code sequence 130, 202. The compiled operations 136, 234 may be compiled with instructions 236, 238 for the CPU 140 on which the compiled operation 136, 234 will be performed.

The blocks 302 and 304 may be performed in parallel. For example, the CPU 140 may be multi-threaded and may be configured to simultaneously execute the code sequence 130, 202 in the emulation model 114 and compile the code sequence 130, 202 with the compilation model 110.

The system may then detect that the compiled operations exceed a compilation threshold (block 306). The compilation threshold may reflect (i) functions performed frequently during execution of the code sequence, (ii) functions performed frequently by previously-compiled code sequences performed by the system, and (iii) functions required to initiate a service provided by the system. As will be described further below, the compilation threshold may be calculated or determined prior to performance of the method 300 and may indicate that execution can be transferred to the compiled operations 136, 234. The compilation threshold may be selected based on one or more operating conditions of the code sequence 130, 202 being performed. For example, if predictable latency during operation is required, the compilation threshold may be set higher (e.g., to include a greater percentage of the operations 132, 210-222, 232 of the code sequence 132, 202, or to include all of the operations 132, 210-222, 232). In another example, if quicker execution is needed, the compilation threshold may be set lower, or only to include essential functions of the code sequence 132, 202. In determining whether the compilation threshold is exceeded, the system 100 may compare the compiled operations 136, 234 to the compilation threshold. For example, the system 100 may check that the compiled operations 136, 234 exceed a certain percentage of the operations 132, 210-222, 232, or that the compiled operations 136, 234 include specified operations 132, 210-222, 232 within the compilation threshold.

The emulation model may then transfer flow information and program execution information to the compiled operations (block 308). As described further below, the flow information may include an emulation instruction pointer 120 of the emulation model 114 and the program execution information may include an emulation stack pointer 118 and/or an emulation base pointer 116 of the emulation model 114. The flow information and program execution information may be transferred to allow the compiled operations 136, 234 to continue executing the code sequence 130, 202 at the correct instruction 236, 238 and with the correct program execution data 128. In certain implementations, one or both of the flow information and program execution information may need to be translated from the emulation model 114 to the execution environment 102. For example, the emulation model 114 may utilize emulation addresses when creating the emulation base pointer 116, the emulation stack pointer 118, and the emulation instruction pointer 120. In such implementations, the emulation addresses may have to be converted into global addressees of the memory 124 (i.e., addresses used by the execution environment 102 and the CPU 140).

The CPU may then execute the compiled operations (block 310). For example, the CPU 140 may sequentially execute the instructions 236, 238 of the compiled operations 234, 136, as created by the compiler 112. Using the flow information transferred at block 308, the CPU 140 may begin executing the compiled operations 136, 234 at the instruction corresponding to the next instruction identified in the flow information. For example, the CPU 140 may begin executing the compiled operations 136, 234 at the instruction 236, 238 stored within the memory 124 at the address identified by the emulation instruction pointer 120 (e.g., the instruction 236, 238 of the compiled operation 234 corresponding to the next instruction was previously identified to be emulated within the emulation model 114). In certain implementations, the CPU 140 may be configured to execute the instructions 236, 238 within the execution environment 102.

All or some of the blocks of the method 300 may be optional. Similarly, although depicted as occurring in sequence, one or more of the blocks may be performed in parallel. For example, blocks 302 and 304 may be performed in parallel (e.g., on multiple threads of a multi-threaded CPU 140).

Figure 4:
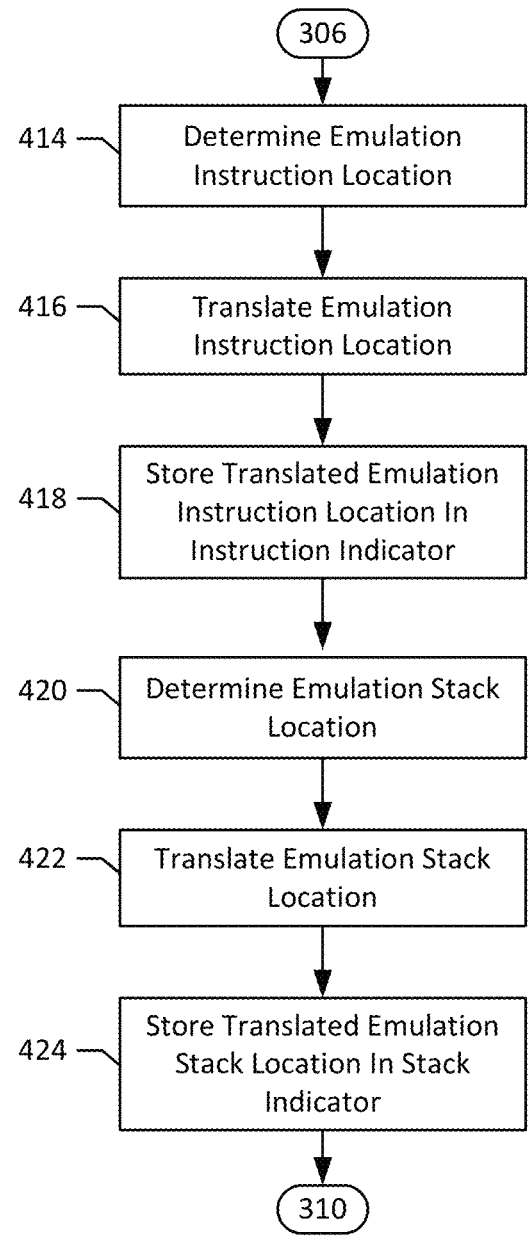
FIG. 4 illustrates a method according to an example embodiment of the present disclosure.

FIG. 4 depicts a method 400 according to an example embodiment of the present disclosure. The method 400 may be performed in order to transfer flow information and program execution information from an emulation model 114 to compiled operations 136, 234. For example, the system 100 may perform the method 400 in order to transfer flow information and program execution information, e.g., at block 308 of the method 300 discussed above. The method 400 may be implemented on a computer system, such as the system 100. For example, method 400 may be implemented by the execution environment 102 and the emulation model 114. The method 400 may also be implemented by a set of instructions stored on a computer readable medium that, when executed by a processor, cause the computer system to perform the method. For example, all or part of the method 400 may be implemented by the CPU 140 and the memory 124. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional The method 400 may begin in response to the system 100 detecting that compiled operations exceed a compilation threshold, e.g., at block 306 of the method 300. The method 400 may begin with the emulation model determining an emulation instruction location (block 414). In determining the emulation instruction location, the emulation model 114 may retrieve the instruction location from the emulation instruction pointer 120 indicating a location of the next instruction to be executed by the emulation model 114 in the course of executing the code sequence 130. For example, the emulation instruction pointer 120 may indicate the location of an instruction 256-262 of an emulated operation 254 being executed by the emulation model 114. In another example, block 414 may occur after the emulation model 114 has completed emulation of an embedded operation 254. In such an instance, the emulated instruction pointer 120 may indicate a location of the next operation 132, 252 to be emulated by the emulation model 114. In certain implementations, the determined emulation instruction location may be stored as an emulation address of a location within an emulation stack stored on the memory 124 (e.g., stored within the stack 126 of the memory 124). Accordingly, in such implementations, the emulation address may differ from a global address of the memory 124 which is required for proper execution by the CPU 140 in the execution environment 102.

The emulation model and/or the CPU may then translate the emulation instruction location (block 416). As discussed above, in implementations where the emulation instruction location is stored as an emulation address for use by the emulation model 114, the emulation address may need to be converted into a global address of the memory 124 for use by the CPU 140 and/or the execution environment 102. Accordingly, the emulation model 114 may perform this conversion. For example, in certain implementations, the emulation model 114 utilizes an emulation stack stored within the memory 124. In such implementations, the emulation address may be stored as an offset from the base of the emulation stack used by the emulation model 114. Accordingly, in translating the emulation instruction location from the emulation address into a global address, the emulation model 114 may add the emulation address indicating an offset from the base of the emulation stack to an emulation base pointer indicating a global address of the base of the emulation stack. Further examples of this translation process are discussed below in connection with FIGS. 5A, 5B, 6A, and 6B.

The emulation model and/or the CPU may then store the translated instruction location in an instruction indicator (block 418). For example, the translated instruction location may be stored on the instruction pointer 108 of the execution environment 102. In another example, the translated instruction location may be stored on the instruction register 146 of the CPU 140. The translated instruction location may be stored on the instruction indicator for later use in executing the compiled operations 136, 234. For example, the translated instruction location may indicate the location of the next instruction 236, 238 of the compiled operations 136, 234 corresponding to the next instruction 256-262 of the emulated operation 254 to be executed. In another example, the translated instruction location may indicate the location of the next compiled operation 136, 234 corresponding to the next operation 132, 252 to be executed.

Next, the emulation model determines the emulation stack location (block 420). The emulation stack location may include information on the location of an emulation stack used by the emulation model 114 in emulating the code sequence 130, 202. For example, the emulation model 114 may store program execution information in the emulation stack while emulating operations 132, 152 of the code sequence 130, 202. In determining the emulation stack location, the emulation model 114 may retrieve the emulation stack location from the emulation stack pointer 118. In certain implementations, the emulation model 114 may also retrieve the emulation base location from the emulation base pointer 116. As with the emulation instruction location, the emulation stack location may be stored as an emulation address of an emulation memory of the emulation model 114. For example, the emulation stack pointer 118 may store a location of the top of the emulation stack relative to the base of the emulation stack, or relative to the emulation memory.

The emulation model and/or the CPU may then translate the emulation stack location (block 422). Similar to translating the emulation instruction location, the emulation stack location may be translated from the emulation address to a global address of the memory 124 for use by the CPU 140 and/or the execution environment 102. The translation process may be similar to the process discussed in connection with block 416.

The emulation model and/or the CPU may then store the translated emulation stack location in a stack indicator (block 424). For example, the translated emulation stack location may be stored on stack pointer 106. In another example, the translated emulation stack location may be stored on stack register 144 of the CPU 140. In still further examples, the translated emulation stack location may include a translated emulation base pointer stored on the base pointer 104 of the execution environment 102 or the base register 142 of the CPU 140. After completing the method 400, the system 100 may then proceed to execute the compiled commands 136, 234 (e.g., block 310) as described above.

In certain implementations, one or more blocks of the method 400 may be executed in parallel. For example, blocks 414-418 and 420-424 may be performed in parallel (e.g., blocks 414 and 420 may be performed in parallel, blocks 416 and 422 may be performed in parallel, and blocks 418 and 424 may be performed in parallel). In other implementations, the blocks may be rearranged. For example, blocks 420-424 may be performed before blocks 414-418.

Figure 5A:
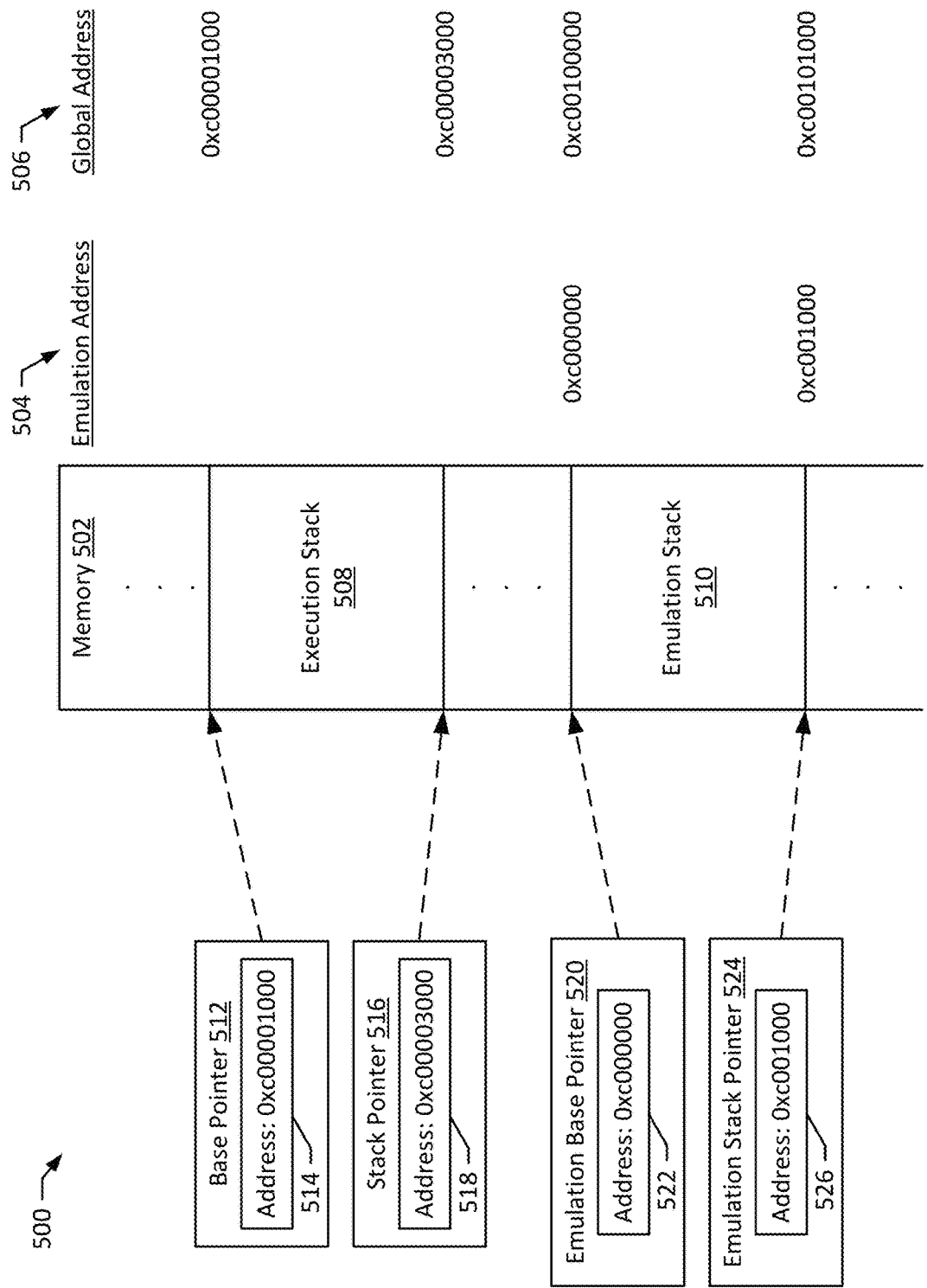
FIG. 5A-5B illustrate a pointer assignment procedure according to an example embodiment of the present disclosure.
Figure 5B:
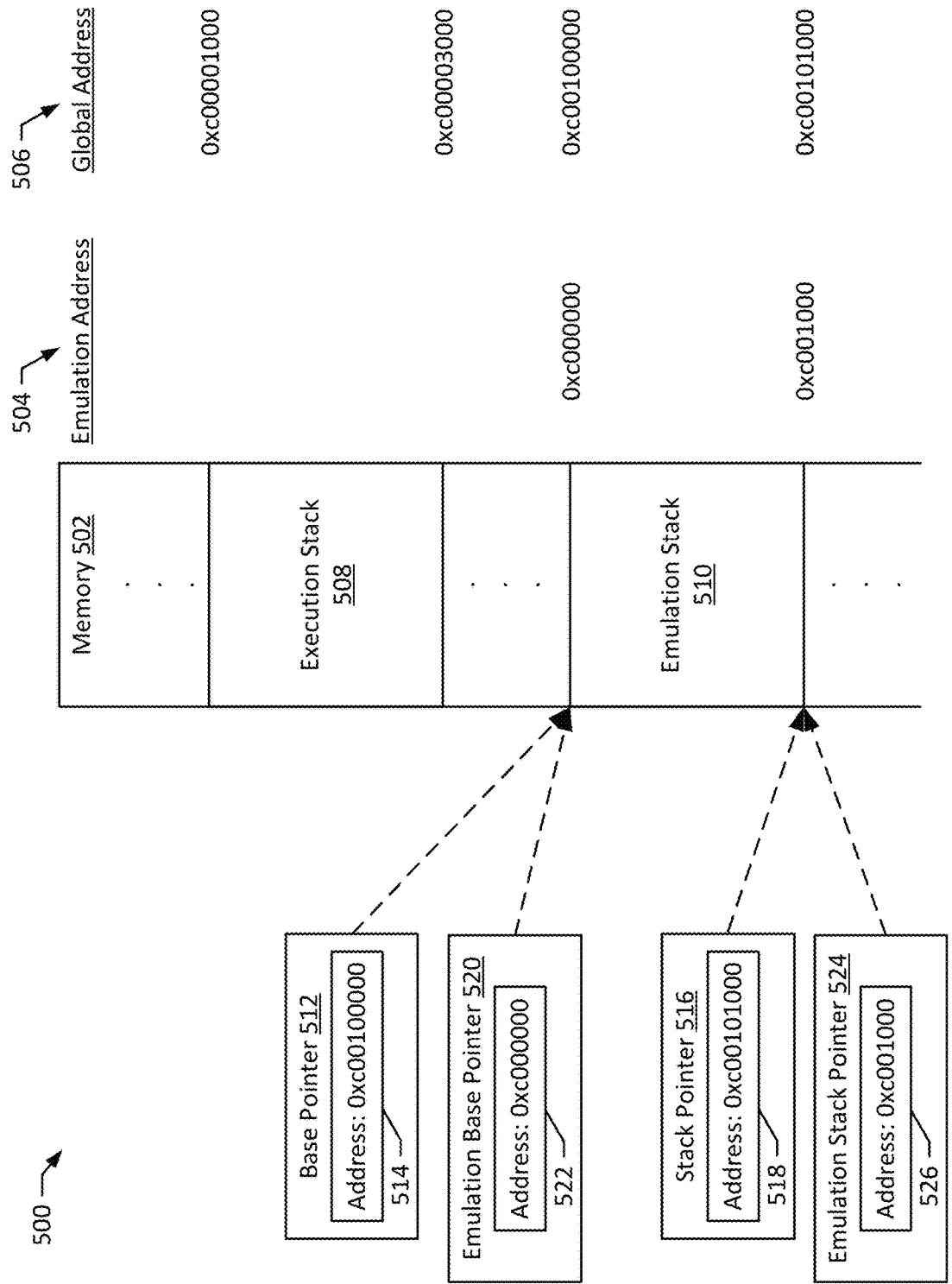

FIGS. 5A-5B depict a pointer assignment procedure 500 according to an example embodiment of the present disclosure. The procedure 500 includes a memory 502 storing an execution stack 508 and an emulation stack 510. The procedure 500 also includes a base pointer 512, a stack pointer 516, and emulation base pointer 520, and emulation stack pointer 524. Each of the pointers 512, 516, 520, 524 store an address 514, 518, 522, 526. The procedure 500 also includes several address indications, including an emulation address 504 and a global address 506. As depicted, only the locations corresponding to the emulation stack 510 include a corresponding emulation address 504, whereas the locations corresponding to an execution stack 508 and the emulation stack 510 have a corresponding global address 506.

The procedure 500 may be used to transfer flow information and program execution information from the emulation model 114 to the compiled operations 136, 234. For example, the procedure 500 may be an example application of the method 400 and/or of the block 306 of the method

300. The procedure 500 may be performed by one or more components of the system 100. For example, the memory 502 may be implemented by the memory 124 and the base pointer 512 and stack pointer 520 may be respectively implemented by the base pointer 104 and the stack pointer 106 of the execution environment 102. In still further examples, the emulation base pointer 520 in the emulation stack pointer 524 may respectively be implemented by the emulation base pointer 116 and the emulation stack pointer 118 and the emulation model 114. As discussed previously, the execution stack 508 may be configured to store program execution data 128 for programs and compiled computer sequences 134 being executed by the CPU 140 and the execution environment 102. Similarly, the emulation stack 510 may be configured to store program execution data 128 for programs being emulated by the emulation model 114.

As shown in initial stage in FIG. 5A, the procedure 500 includes a base pointer 512 storing an address 514 corresponding to the global address of the base of the execution stack 508. The procedure 500 also includes stack pointer 516 storing an address 518 of the top of the execution stack 508. Notably, both addresses 514, 518 stored in the pointers 512, 516 store the global address 506 of their respective locations on the execution stack 508. Namely, the address 514 of the base pointer 512 stores the global address 0xc00001000 of the base of the execution stack within the memory 502 and the address 518 of the stack 516 stores the global address 0xc00003000 of the top of the execution stack 508 within the memory 502. The global addressees 506 may be addressed relative to the base of the memory 502. For example, each location within the memory 502 may have a separate address starting at 0xc00000000, which may increment by one at each subsequent memory location.

The procedure 500 also includes an emulation base pointer 520 storing an address 522 corresponding to the emulation address of the base of the emulation stack 510. The procedure 500 also includes an emulation stack pointer 524 storing an address 526 corresponding to the emulation address of the top of the emulation stack 510. Unlike the base pointer 512 and the stack pointer 516, the emulation base pointer 520 and the emulation stack pointer 524 store addresses 522, 526 corresponding to the emulation addresses 504 of their respective locations within the emulation stack 510. Namely, the address 522 the emulation base pointer 520 stores the emulation address 0xc000000 of the base of the emulation stack 210 and the emulation stack pointer 524 stores the emulation address 0xc001000 of the top of the emulation stack 510. Such an implementation may result from the emulation base pointer 520 and the emulation stack pointer 524 being generated and updated by the emulation model 114 in the course of executing one or more operations 132, 252 of the code sequence 130, 202. For example, the emulation addresses 504 may be addressed relative to the base of an emulation memory created by the emulation model 114 and stored on the memory 502 in the course of executing a code sequence 130, 202. Similar to the global address 506 of the memory 502, each location within the verb emulation memory may have a separate address starting at 0xc000000, which may increment by one in each subsequent emulation memory location. Notably, the emulation address 504 includes fewer digits than the global address 506, indicating that the emulation memory may be smaller than the memory 502, as the memory 502 stores the emulation memory. Similarly, the emulation stack 510 may be smaller in size than the execution stack 508, as the emulation stack 510 may only store program execution for the emulation model 114, whereas the execution stack 508 may store program execution information for the system 100. For example, as depicted, the emulation stack 510 has a size of 0x1000 (i.e., the emulation stack 510 spans global addresses 0xc00100000-0xc0010100) and the execution stack 508 has a size of 0x2000 (i.e., the execution stack 508 spans global addresses 0xc00001000-0xc00003000).

As described above in connection with the method 400, in order to transfer the program execution information, the emulation stack location (e.g., the emulation base pointer 520 and the emulation stack pointer 524 must be translated before storing the translated emulation stack location in a stack indicator, such as the stack pointer 516 and the base pointer 512. For example, the emulation address 504 for the base and top of the emulation stack respectively stored in the emulation base pointer 520 and emulation stack pointer 524 may need to be translated into the corresponding global address 506 for storage within the base pointer 512 and stack pointer 516. In performing this translation, the emulation model 114 may add the emulation address 504 to the global address 506 corresponding to the base of the emulation memory. As depicted in FIG. 5A, the base of the emulation memory is the same as the base of the emulation stack 510, at emulation address 0xc000000 and global address 0xc00100000. Accordingly, to translate the addresses 518, 526 of the emulation base pointer 520 and emulation stack pointer 524, the emulation model 114 may add the address 518, 526 to the global address of the base of the emulation memory (i.e., 0xc00100000). The translated addresses can then be stored as the addresses 514, 522 of the base pointer 512 and the stack pointer 516.

FIG. 5B depicts the result of this operation. In particular, the base pointer 512 now stores the global address 506 of the base of the emulation stack 510 and the stack pointer 516 now stores the global address 506 of the top of the emulation stack 510. As can be seen, adding the emulation address 504 retrieved from the address 522 of the emulation base pointer 520 (i.e., 0xc000000) to the global address 506 of the base of the emulation memory (i.e., 0xc00100000) results in the global address 506 of the base of the emulation stack 510 (i.e., 0xc000000+0xc00100000=0xc00100000), which is stored in the address 514 of the base pointer 512. Similarly, adding the emulation address 504 retrieved from the address 526 of the emulation stack pointer 524 (i.e., 0xc001000) to the global address 506 of the base of the emulation memory (i.e., 0xc00100000) results in a global address 506 of the top of the emulation stack 510 (i.e., 0xc001000+0xc00100000=0xc00101000), which is stored in the address 518 of the stack pointer 516.

By performing the procedure 500, the system 100 has now transferred the program execution information generated and used by the emulation model 114 and executing previous operations 132, 210-222, 232, 252 of a code sequence 130, 202. In this way, when execution of the compiled operations resumes, the compiled operations 136, 234 then have access to the correct program execution data.

Figure 6A:
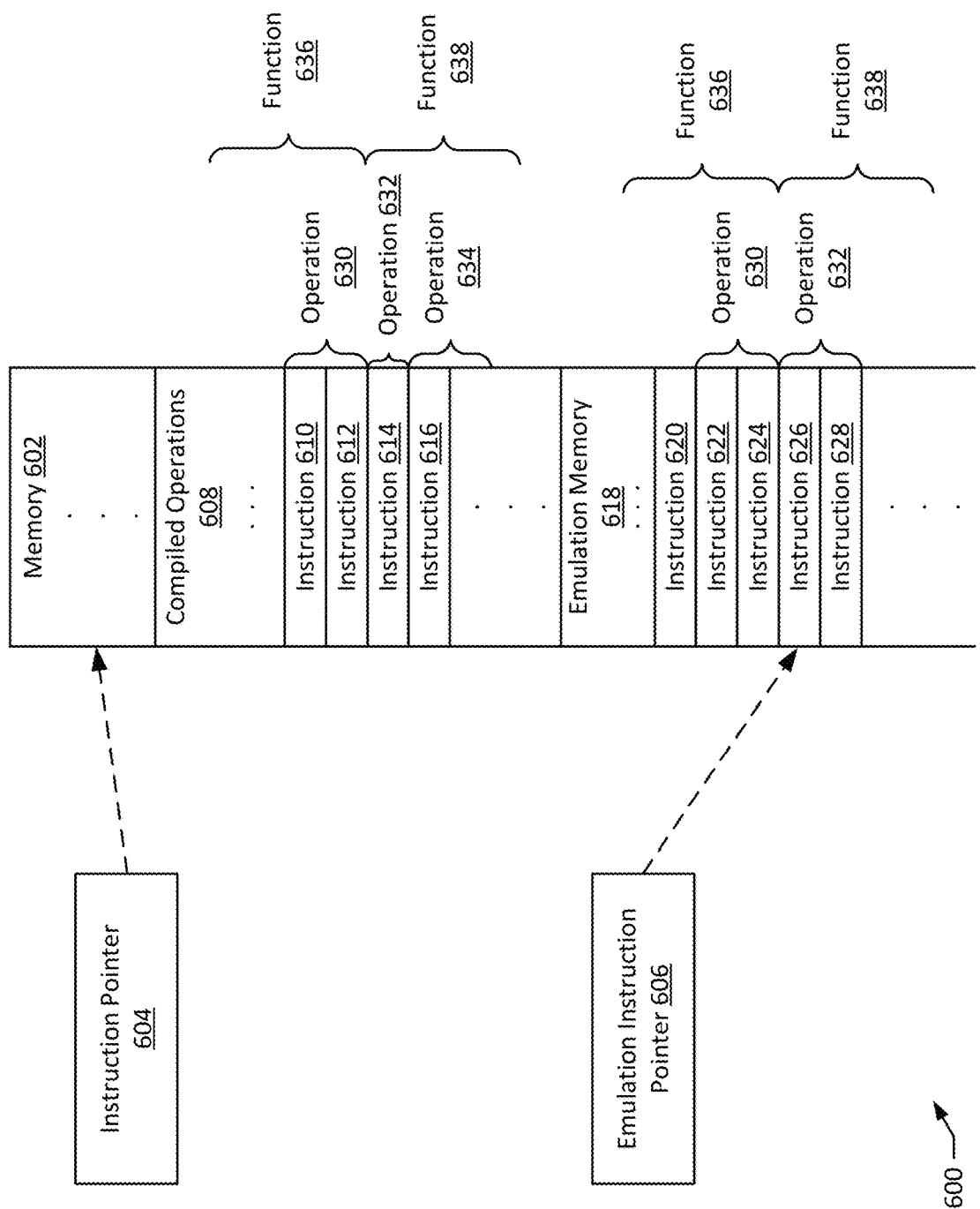
FIGS. 6A-6B illustrate a pointer assignment procedure according to an example embodiment of the present disclosure.
Figure 6B:
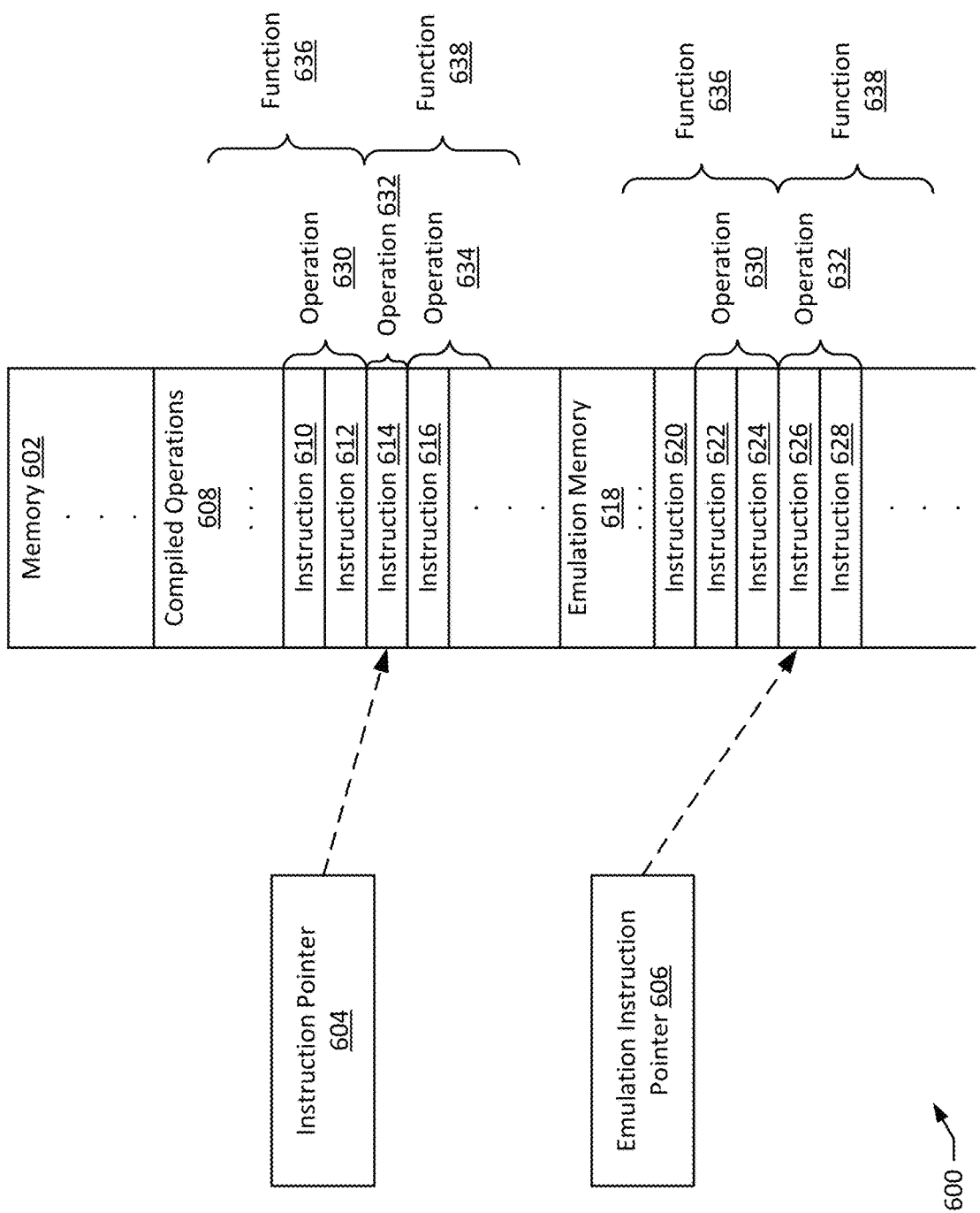

FIGS. 6A-6B depict a pointer assignment procedure 600 according to an example embodiment of the present disclosure. The procedure 600 may be performed to transfer flow information from an emulation model 114 to compiled operations 608. For example, the procedure 600 may be an example application of the method 400 and/or of block 306 of the method 300. The procedure 600 may be performed by one or more components of the system 100. For example, the memory 602 may be implemented by the memory 124, the instruction pointer 604 may be implemented by one or both of the instruction pointer 100 and the instruction register 146, and the emulation instruction pointer 606 may be implemented as the emulation instruction pointer 120 of the emulation model 114. Further, the compiled operations 608 stored on the memory 602 may represent one or more of the compiled operations 136, 234 compiled by the compiler 112.

Procedure 600 includes a memory 602 storing compiled operations 608 and an emulation memory 618. The compiled operations 608 include a plurality of instructions 610-616 corresponding to multiple operations 630, 632, 634. Each operation 630-634 includes one or more of the instructions 610-616. The operations 630-634 are organized into a plurality of functions 636, 630. For example, function 636 includes an operation 630 and other operations in the compiled operation 608 not depicted. Function 638 includes operations 632, 634, and subsequent operations are not depicted for simplicity. The compiled operations 608 may be compiled from operations 132, 210-222, 232, 252 of a code sequence 130, 202.

The emulation memory 618 stores instruction 620-628, corresponding to the operations 630, 632. As mentioned previously, the operation 630 corresponds to function 636 and the operation 632 corresponds to function 638. Within the compiled operations, the operations 630, 632, 634 may have a different number of corresponding instructions then when emulated in stored within the emulation memory 618. As discussed previously, the emulation model 114 may not translate the operations 630, 632, 634 as efficiently as the compiler 112, emulated operations 254 corresponding to the operation 630, 632, 634 may contain a large number of instructions 620-628 and the corresponding compiled operation 608. For example, operation 632 contains two instructions 626, 628 within the emulation memory 618, but contains only one instruction 614 within the compiled operation 608.

The emulation instruction pointer 606 may contain a location corresponding to the next instruction to be executed within the emulation model 114. For example, as depicted, the emulation instruction pointer 606 stores the location within the emulation memory 618 corresponding to the instruction 626. The instruction pointer 604 may store location corresponding to the next instruction to be executed by the CPU 140 (e.g., within the execution environment 102). As depicted, the instruction pointer 604 storing the location for an instruction to be executed that is not depicted in FIG. 6A.

In order to transfer flow information from the emulation model 114 to the execution environment 102 in the CPU 140, the emulation instruction locations stored in the emulation instruction pointer 606 may need to be translated to the location of a corresponding instruction 610-616 of them the compiled operation 608. In certain implementations, the transfer of flow information may occur after the emulation model 114 is completed execution of an operation 630, 632 and/or a function 636, 638. For example, as depicted, the transfer of the flow information is occurring after the emulation model 114 has completed execution of the instructions 622, 624 of the operations 630, which itself is the last operation of the function 636. For example, as discussed previously, when the system 100 detects that the compiled operations 608 exceed a compilation threshold for the code sequence 130, 202 intended for execution by the system 100, the emulation model 114 may wait for the completion of one or both of an operation 630, 632, 634 and function 636, 638 and, upon detecting such completion, may trigger transfer of the flow information to the compiled operations 608 for further execution by the compiled operations 608.

In transferring the flow information, the emulation model 114 may first determine the emulation instruction location from the emulation instruction pointer 606. As depicted, the emulation model 114 may determine that the next instruction to be executed is instruction 626 of the operation 632 of the function 638. The emulation model 114 may then translate the emulation instruction location into the location of a corresponding instruction 610-616 of the compiled operations 608. For example, the instruction 626 identified by the emulation instruction pointer 606 is the first instruction of the operation 632. Accordingly, the emulation model 114 may determine that the corresponding instruction 610-616 of the compiled operation 608 is instruction 614, as it is also the first instruction of the operations 632. The location of the corresponding instruction may then be stored in the instruction pointer 604. For example, in FIG. 6B, instruction pointer 604 now stores the location of the instruction 614.

Transferring flow information in this way, namely the location of the next instruction of the compiled operation 608 to be executed by the execution environment 102 and/or the CPU 140, the compiled operation 608 may then be executed from the same point within the code sequence 130, 202 at which the emulation model 114 stopped emulating. In particular, when the execution environment 102 loads the instruction 614 whose location is stored by the instruction pointer 604, the correct instruction will be loaded such that execution of the compiled operations 608 continues with the operation 632, as the emulation model 114 previously completed executing the operations 630.

Figure 7:
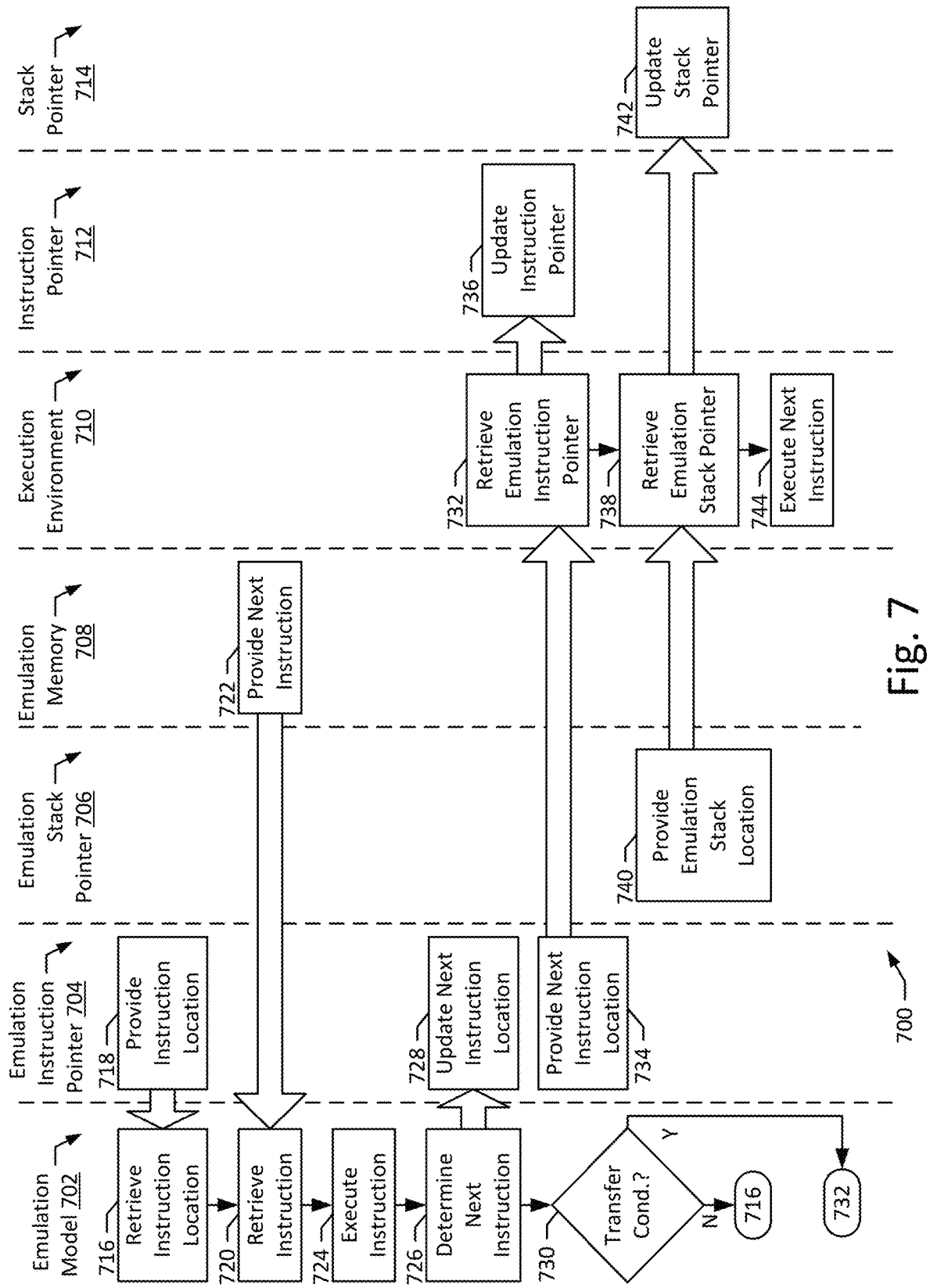
FIG. 7 illustrates a method according to an example embodiment of the present disclosure.

FIG. 7 depicts a method 700 according to an example embodiment of the present disclosure. The method 700 may be executed to transfer flow information and/or program execution information from an emulation model 114 to compiled operations 136, 234. The method 700 may be implemented on a computer system, such as the system 100. For example, method 700 may be implemented by the execution environment 102 and the emulation model 114. The method 700 may also be implemented by a set of instructions stored on a computer readable medium that, when executed by a processor, cause the computer system to perform the method. For example, all or part of the method 700 may be implemented by the CPU 140 and the memory 124. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

FIG. 7 includes an emulation model 702, which may be an example implementation of the emulation model 114. FIG. 7 also includes an emulation instruction pointer 704 and an emulation stack pointer 706, which may be example implementations of the emulation instruction pointers 120, 606 and the emulation stack pointers 118, 524. FIG. 7 further depicts an emulation memory 708, which may be an example implementation of the emulation memory 618. FIG. 7 also includes an execution environment 710, instruction pointer 712, and stack pointer 714, which may be example implementations of the execution environment 102, instruction pointers 108, 604, and stack pointers 106, 516, respectively.

The method 700 begins with the emulation model 702 retrieving the instruction location (block 716). The emulation instruction pointer 704 may provide the instruction location to the emulation model 702 (block 718). As discussed above, the instruction location provided by the emulation instruction pointer 704 may be stored as an emulation address of the location of the next instruction to be emulated within the emulation memory 708.

The emulation model 702 may then retrieve the instruction (block 720) from the emulation memory 708 (block 722). The emulation model 702 may retrieve the instruction from the address in the emulation memory 708 provided by the emulation instruction pointer 704 is instruction location at block 718. The instruction retrieved may have been previously translated by the emulation model 114 from an operation 132, 210-222, 232, 252 of the code sequence 130, 202. Additionally, as discussed above, the instructions translated in this matter may be less efficient from an execution time perspective than instructions generated by a compiler 112. The emulation model 114 may then execute the instruction provided at block 722 (block 724). The emulation model 114 may provide the instruction to be executed to the CPU 140 for execution.

After executing the instruction, the emulation model 702 may then determine the next instruction for execution (block 726). The emulation model 702 may select the next instruction to be executed is the next instruction translated from the operation that is currently being executed by the emulation model 702. For example, the operation 632 of the procedure 600 included two instructions 626, 628 that were translated by an emulation model 114 for execution of the operation 632. After executing the instruction 626, the emulation model 702 may select the subsequent instruction 628 for execution. In instances where the instruction executed a block 724 was the final instruction for an operation 132, 210-222, 232, 252, 630-634, the emulation model 702 may translate the next operation 132, 210-222, 232, 252, 630-634 of the code sequence 130, 202 into a plurality of instructions 256-262, 620-628 for execution. The emulation model 702 may then select the first of the translated instructions 256-262, 620-628 as the next instruction 256-262, 620-628 to be executed. After determining the next instruction 256-262, 620-628, the emulation model 702 may update the emulation instruction pointer 704 with the instruction location of the next instruction 256-262, 620-628 to be executed (block 728). For example, the emulation model 702 may the emulation memory 708 corresponding to the next instruction 256-262, 620-628 for execution. In instances where the next instruction 256-262, 620-628 to be executed is a subsequent execution within the same operation, the emulation model 702 may select the next instruction location as the next address in the emulation memory 708. In instances where an operation 132, 210-222, 232, 252, 630-634 is translated by the emulation model 702 prior to execution, the emulation model 702 may select the first address for the location in the emulation memory 708 at which the translated instructions 256-262, 620-628 were stored.

The emulation model 702 may then check to see whether a transfer condition has been met (block 730). For example, a CPU 140 may, in parallel with the emulation model 702 executing the instructions 256-262, 620-628 and operations 132, 210-222, 232, 252, 630-634, be compiling the operations 132, 210-222, 232, 252, 630-634 into compiled operations 136, 234, 608. The emulation model 702 may check to see whether the compiled operations 136, 234, 608 exceed a compilation threshold of the code sequence 134, 202. For example, the compilation threshold may specify (i) functions 204-208, 636, 638 performed frequently during execution of the code sequence 130, 202, (ii) functions 204-208, 636, 638 performed frequently by previously-compiled code sequences 130, 202 performed by the system 100, and (iii) functions 204-208, 636, 638 required to initiate a service provided by the system 100. The emulation model 702 may check whether the transfer condition is met at block 730 after the execution of each instruction is completed. In other implementations, as discussed above, the emulation model 702 may only check whether the transfer condition is met at block 730 after the emulation model 702 is completed execution of an operation 132, 210-222, 232, 252, 630-634 or a function 204-208, 636, 638. If it is determined that the transfer condition is not met at block 730, the emulation model 702 may retrieve the instruction location (blocks 716, 718) and proceed with executing the instruction as discussed above (blocks 720-728).

If the emulation model 702 determines that the transfer condition has been met, the method 700 may continue with the execution environment 710 retrieving the instruction pointer (block 732). For example, the emulation instruction pointer 704 may provide the next instruction location (block 734). The instruction pointer 712 may then be updated (block 736). For example, the next instruction location provided by the emulation instruction pointer 704 may be stored as an emulation address within the emulation memory 708. Also, the next instruction location from the emulation instruction pointer 704 may be the location of an instruction 256-262, 620-628 corresponding to an emulated operation 254, or stored within an emulation memory 618. In order to properly transfer flow information and have execution resume with the compiled operations 136, 234, 608, it may be necessary to first translate the next instruction location provided by the emulation instruction pointer 704 to the location of a corresponding compiled operation 136, 224, 608 or instruction 236, 238, 610-616, as described above. For example, the execution environment 710 or the emulation model 702 may identify a compiled operation 136, 234, 608 or instruction 236, 238, 610-616 corresponding to the next instruction to be executed by the emulation model 702. The emulation model 702 or execution environment 710 may then identify the address within a memory 124, 502, 602 of the system 100 storing the corresponding operation 136, 234, 608 or instruction 236, 238, 610-616. The instruction pointer 712 may then be updated at block 736 with the address.

The execution environment 710 may then retrieve the emulation stack location (block 738). The emulation stack pointer 706 may provide the emulation stack location (block 740). The emulation stack location may include one or both of the emulation base pointer 116, 520 and the emulation stack pointer 118, 524. The emulation base pointer 116, 520 may store an address 522 corresponding to the base of the emulation stack 510 as an emulation address 504 of an emulation memory 618. The emulation stack pointer 706, 118, 524 may store an address 526 correspond to the top of the emulation stack 510 as an emulation address 504 of an emulation memory 618. Accordingly, as with the emulation instruction pointer and as discussed above, the emulation stack location may need to be translated for use by the compiled operations 136, 232, 608 in order to properly transfer program execution data 128. For example, as discussed above, the emulation address 504 stored in the emulation base pointer 116, 520 and the emulation stack pointer 706, 118, 524 may need to be converted into a global address 506 for use by the base pointer 104, 512 and the stack pointer 714, 106, 516. In certain implementations, the emulation address 504 may be converted into a global address 506 by adding the emulation address 50428 global address 506 of the base of the emulation memory 618 the emulation stack 510. After the emulation stack location is translated, the execution environment 710 may update the stack pointer 714 and/or a base pointer 116, 512 with the updated stack pointer location (block 742). After performing block 742, the stack pointer 714 and/or the base pointer 116, 512 may then store the global addresses of the emulation stack 510, and may thereby point to the emulation stack 510 instead of the execution stack 508.

The execution environment 710 may then proceed with executing the next instruction (block 744). For example, the execution environment 710 may retrieve the instruction 236, 238, 610-616 stored at the updated instruction pointer stored on the instruction pointer 712. Because the updated instruction pointer refers to the location of an instruction 236, 238, 610-616 within the compiled operations 136, 234, 608, execution of the instructions 236, 238, 610-616 may proceed with the compiled operations 136, 234, 608 moving forward. In this way, execution of the code sequence 130, 202 is transferred from the emulation model 702 to the compiled operations 136, 234, 608. Accordingly, as described above, the compiled operations 136, 234, 608 compiled by the compiler 112 may have fewer instructions and may accordingly result in faster execution. Accordingly, after execution of the code sequence 130, 202 occurs, overall execution speed may increase. However, because execution of the code sequence 130, 202 initially began with the emulation model 702 while the compiled operations 136, 234 were compiled, overall execution of the code sequence 130, 202 may proceed further, as the emulation model 702 may be able to complete execution of one or more instructions 256-262, 620-628, operations 132, 210-222, 232, 252, 630-634, and functions 204-208, 636, 638 while the compiled operations 136, 234 are compiled by the compiler 112.

Figure 8:
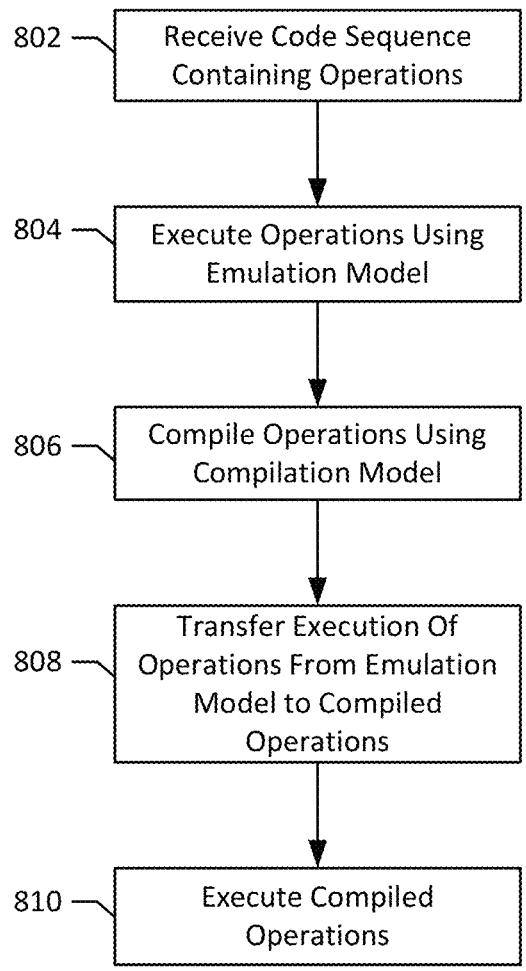
FIG. 8 illustrates a method according to an example embodiment of the present disclosure.

FIG. 8 depicts a method 800 according to an example embodiment of the present disclosure. The method 800 may be performed to begin executing a code sequence 130, 202 in an emulation model 114 while also compiling the code sequence 130, 202 with a compiler 112 and to transfer execution to compiled operations 136, 234. The method 800 may be implemented on a computer system, such as the system 100. For example, method 800 may be implemented by the execution environment 102 and the emulation model 114. The method 800 may also be implemented by a set of instructions stored on a computer readable medium that, when executed by a processor, cause the computer system to perform the method. For example, all or part of the method 800 may be implemented by the CPU 140 and the memory 124. Although the examples below are described with reference to the flowchart illustrated in FIG. 8, many other methods of performing the acts associated with FIG. 8 may be used. For example, the order of some of the blocks may be changed, certain blocks may be combined with other blocks, one or more of the blocks may be repeated, and some of the blocks described may be optional.

The method 800 begins by receiving a code sequence containing operations (block 802). For example, the code sequence 130, 202 may be received from a user, such as a computer program or other system designer. The code sequence 130, 202 may be received for execution by a system 100.

An emulation model may then begin executing the operations of the received code sequence (block 804). As discussed above, the emulation model 114, 702 may begin executing the operations 132, 210-222, 232, 252, 630-634 by translating a first operation of the received code sequence 130, 202 into an emulated operation 254 with a plurality of instructions 256-262. The emulation model 114, 702 and then proceed with executing the instructions 256-262, 620-628 sequentially (e.g., using the CPU 140). The emulated operation 254 and related instruction 256-262 may be stored within an emulation memory 618, which is itself stored on a memory 124, 502, 602 of the system 100. After the emulation model 114 completes execution of the first operation of the code sequence 130, 202, the emulation model 114, 702 may then translate and similarly execute subsequent operations of the code sequence 130, 202.

The compilation model may also compile the operations of the code sequence (block 806). As discussed above, the compilation model 110 may include a compiler 112 configured to compile the operations into compiled operations 136, 234, 608 that include a plurality of instructions 236, 238, 610-616. As also discussed above, the compiled operations 136, 234, 608 may contain fewer instructions 236, 238, 610-616 than the corresponding emulated operations 254 and may therefore ultimately execute quicker than the emulated operations 254. However, the compiled operations 136, 234, 608 may take longer to initially begin execution, as the compiler 112 may be configured to compile a plurality of the operations 132, 210-222, 232, 252, 630-634 before beginning execution, whereas the emulation model 114 begins by translating the first operation 132, 210-222, 232, 252, 630-634.

The compilation model 110 may be configured to compile the operations 132, 210-222, 232, 252, 630-634 of the code sequence 130, 202 in parallel with the execution of the operations 132, 210-222, 232, 252, 630-634 using the emulation model 114, 702. For example, the emulation model 114 in the compilation model 110 may both be implemented by a CPU 140 configured to execute the emulation model 114 in the compilation model 110 in parallel (e.g., different threads of the CPU 140).

The system may then transfer execution of the operations from the emulation model to the compiled operations (block 808). As discussed above, execution may be transferred from the emulation model 114, 702 to the compiled operations 136, 234, 608 by transferring flow information and program execution information from the emulation model 1142 and execution environment 102. For example, the flow information may include an emulation instruction pointer 120, 606, 704 of the emulation model 114, 702 and the program execution information may include an emulation base pointer 116, 520 and an emulation stack pointer 118, 524, 706 of the emulation model 114, 702. As also discussed above, one or more of the emulation instruction pointer 120, 606, 704, the emulation base pointer 116, 520, and the emulation stack pointer 118, 524, 706 may need to be translated before transfer to the execution environment 102.

In certain implementations, execution of the operations 132, 210-222, 232, 252, 630-634 may be transferred in response to a determination that a transfer condition is met. For example, the transfer may occur when the compiled operations 136, 234, 608 exceed a compilation threshold. As discussed above, this compilation threshold may include (i) functions 204-208, 636, 638 performed frequently during execution of the code sequence 130, 202, (ii) functions 204-208, 636, 638 performed frequently by previously-compiled code sequences 130, 202 performed by the system 100, and (iii) functions 204-208, 636, 638 required to initiate a service provided by the system 100.

The execution environment may then execute the compiled operations (block 810). For example, as discussed above, the execution environment 102 may retrieve an instruction 236, 238, 610-616 of a compiled operation 136, 224, 608 corresponding to the next instruction for execution by the emulation model 114, 702. Because the program execution information was also transferred, the compiled operations 136, 224, 608 may be able to continue execution of the code sequence 130, 202 using the same program execution information, thereby maintaining continuity after transfer.

Figure 9:
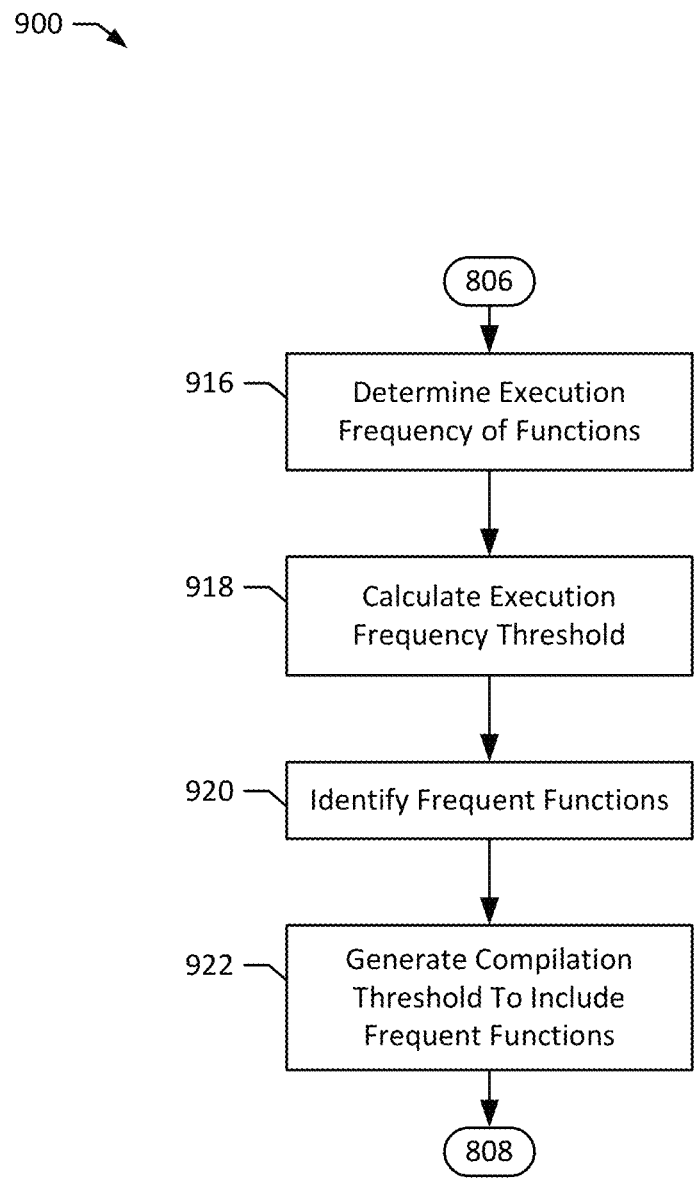
FIG. 9 illustrates a method according to an example embodiment of the present disclosure.

FIG. 9 depicts a method 900 according to an example embodiment of the present disclosure. The method 900 may be performed in order to generate a transfer condition, such as a compilation threshold for use in determining whether execution of a code sequence 130, 202 can be transferred from the emulation model 114, 702 to compiled operations 136, 234, 608. For example, the system 100 may perform the method 900 in order to generate a compilation threshold for use in determining whether a transfer condition is met at, e.g., block 808 of the method 800. In other examples, the method 900 may be performed to generate a compilation threshold for use in determining whether a transfer condition is met at block 730 of the method 700 and/or block 306 of the method 300.

The method 900 may be implemented on a computer system, such as the system 100. For example, method 900 may be implemented by the execution environment 102 and the emulation model 114. The method 900 may also be implemented by a set of instructions stored on a computer readable medium that, when executed by a processor, cause the computer system to perform the method. For example, all or part of the method 900 may be implemented by the CPU 140 and the memory 124. Although the examples below are described with reference to the flowchart illustrated in FIG. 9, many other methods of performing the acts associated with FIG. 9 may be used. For example, the order of some of the blocks may be changed, certain blocks may be combined with other blocks, one or more of the blocks may be repeated, and some of the blocks described may be optional.

The method 900 may begin with the emulation model or the execution environment determining the execution frequency of functions of the code sequence (block 916). For example, the execution frequency may be determined by evaluating the code sequence 130, 202 to determine the frequency with which one or more of the functions 204-208, 636, 638 are called. In another example, the execution frequency may be determined by comparing the functions 204-208, 636, 638 with previous functions executed by the system 100. The previous functions may have known execution frequencies based on previous executions of the previous functions. The execution frequency may be selected as the execution frequency of a similar function 204-208, 636, 638 (e.g., a function that shares a certain percentage of operations 132, 210-222, 232, 252, 630-634) or as a composite execution frequency of a plurality of similar functions 204-208, 636, 638.

The emulation model 114, 702 or the execution environment 102, 710 may then calculate an execution frequency threshold (block 918). The execution frequency threshold may determine an execution frequency at which a function 204-208, 636, 638 will be considered a frequent function. For example, the compilation threshold generated in performing the method 900 may identify plurality of frequent functions that must be compiled before execution can be transferred from the emulation model 114, 702 to the execution environment 102, 710. The execution frequency threshold may be used to determine which functions 204-208, 636, 638 are frequent functions. For example, frequent functions may be identified as those functions 204-208, 636, 638 with an execution frequency above the execution frequency threshold. The execution frequency threshold may be calculated to meet one or more performance requirements for the code sequence 130, 202. For example, if predictable latency is required over maximum possible execution speed, the execution frequency threshold may be set lower, such that more functions 204-208, 636, 638 of the code sequence 130, 202 are included within the frequent functions. In another example, if fast execution speed is prioritized, the execution frequency threshold may be set higher, such that fewer functions 204-208, 636, 638 of the code sequence 130, 202 (and only the most important functions 204-208, 636, 638) are included within a list frequent functions. As discussed above, the emulation model 114 may execute code sequences 130 slower than the execution environment 102, 710 and the CPU 140 are able to execute compiled code sequences 134. Accordingly, the overall execution speed of the code sequence 130 may be improved if execution of the code sequence 130, 202 is transferred from the emulation model 114, 702 to the emulation environment 102, 710 earlier. By setting the execution frequency threshold higher, only functions 204-208, 636, 638 with high execution frequencies are compiled before execution is transferred from the emulation model 114, 702. In certain implementations, the execution frequency threshold may be set to zero such that all function 204-208, 636, 638 of the code sequence 130, 202 are included in the frequent functions.

The emulation model or the execution environment may then identify the frequent functions of the code sequence 130, 202 (block 920). As discussed above, the frequent functions may include those functions 204-208, 636, 638 with execution frequencies that exceed the execution frequency threshold. Is also discussed above, the execution frequency threshold may be set lower to include more functions 204-208, 636, 638 within the frequent functions, or may be set higher to include fewer functions 204-208, 636, 638 within the frequency functions, according to execution requirements of the code sequence 130, 202.

The method 900 may then proceed with generating the compilation threshold to include the frequent functions (block 922). The compilation threshold may identify the functions 204-208, 636, 638 and/or the operations corresponding to the functions 204-208, 636, 638 included within the frequent functions. For example, the compilation threshold may include an indication of the frequent functions, such as a location indication within the code sequence 130, 202, or an indication of a location within the memory 124 corresponding to the frequent functions 204-208, 636, 638 and related operations. The compilation threshold may then be used as a transfer condition to determine when to transfer execution from the emulation model 114, 702 to the compiled operations 136, 234, 608. For example, the emulation environment 114, 702 may refrain from transferring execution to the compiled operations 136, 234, 608 until each function of the frequent functions has been compiled into one or more compiled operations 136, 234, 608 by a compiler 112.

As discussed above, the blocks of the method 900 may be performed in an order different from that depicted in FIG. 9. For example, in certain implementations, the method 900 may be performed by calculating the execution frequency threshold (e.g., at block 918) before determining the execution frequency of the functions 204-208, 636, 638 (e.g., at block 916).

Figure 10:
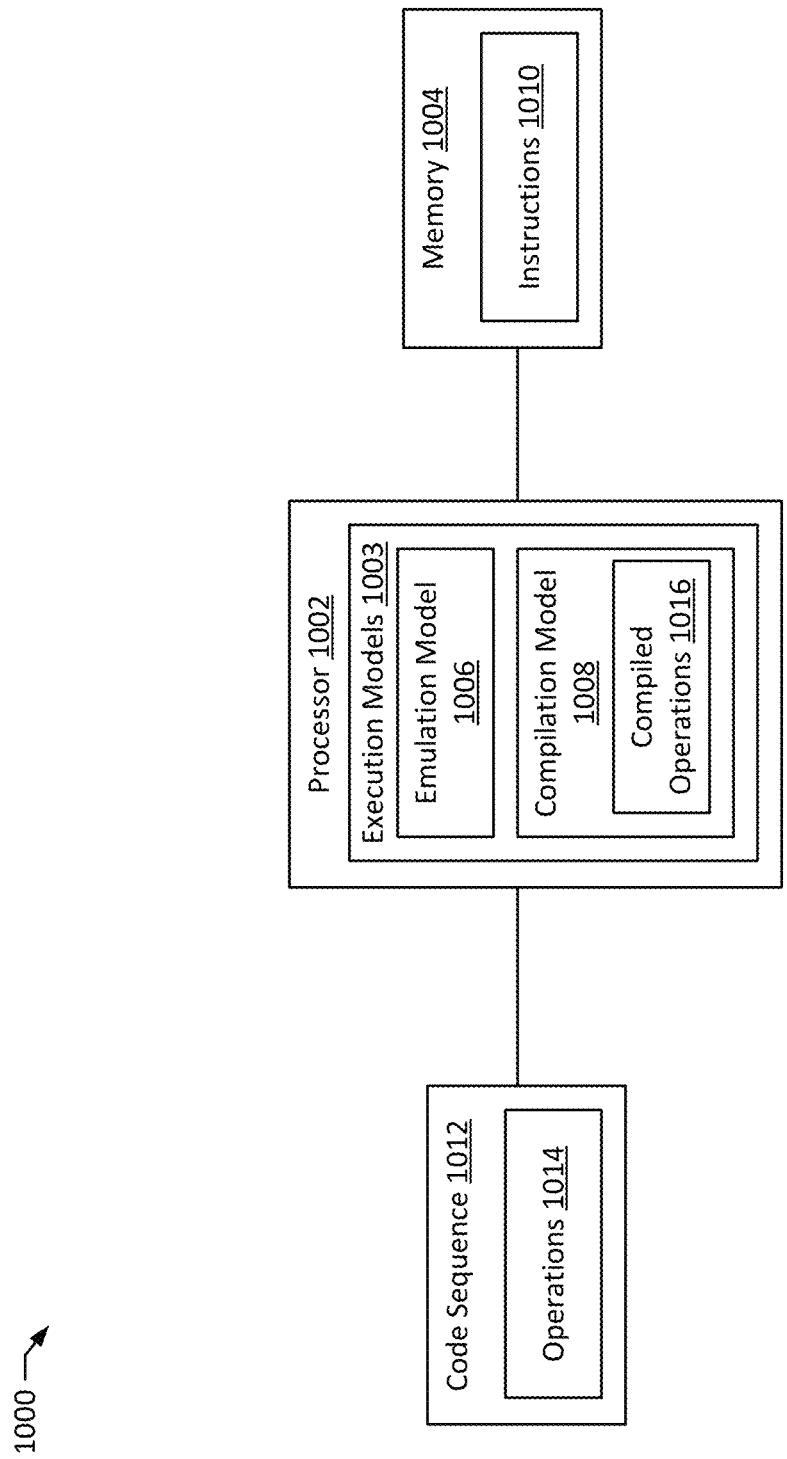
FIG. 10 illustrates a system according to an example embodiment of the present disclosure.

FIG. 10 depicts a system according to an example embodiment of the present disclosure. The system 1000 includes a processor 1002 and a memory 1004. The processor 1002 implements a plurality of execution models 1003 including an emulation model 1006 for executing operations and a compilation model 1008 for compiling operations. The memory 1004 contains instruction 1010 which, when executed by the processor 1002, cause the processor 1002 to receive a code sequence 1012 containing operations 1014 for performance by the system 1000. When executed, the instructions 1010 may also cause the processor 1002 to execute the operations 1014 of the code sequence 1012 using the emulation model 1006 and compile the operations 1014 of the code sequence 1012 into compiled operations 1016 using the compilation model 1008. When executed, the instructions 1010 may further cause the processor 1002 to transfer execution of the operations 1014 from the emulation model 1006 to the compiled operations 1016 and execute the compiled operations 1016.

Other computer system designs and configurations may also be suitable to implement the systems and methods described herein. The following examples illustrate various implementations in accordance with one or more aspects of the present disclosure.

Example 1 is a system comprising a processor implementing a plurality of execution models including (i) an emulation model for executing operations and (ii) a compilation model for compiling operations. The system also comprises a memory containing instructions which, when executed by the processor, cause the processor to receive a code sequence containing operations for performance by the system, execute the operations of the code sequence using the emulation model, compile the operations of the code sequence into compiled operations using the compilation model, transfer execution of the operations from the emulation model to the compiled operations, and execute the compiled operations.

Example 2 is the system of example 1, wherein the memory contains further instruction which, when executed by the processor, cause the processor to detect that a current compilation level of the code sequence exceeds a compilation threshold of the code sequence.

Example 3 is the system of any one of examples 1 and 2, wherein the compilation threshold represents a percentage of operations of the code sequence to be compiled into compiled operations before transferring execution of the operations from the emulation model to the compiled operations.

Example 4 is the system of any one of examples 1-3, wherein the compilation threshold represents a predefined subset of the operations of the code sequence to be compiled into compiled operations before transferring execution of the operations from the emulation model to the compiled operations.

Example 5 is the system of example 4, wherein the operations include one or more functions and the predefined subset of the operations is identified as operations representing one or both of (i) functions performed frequently during execution of the code sequence, (ii) functions performed frequently by previously-compiled code sequences performed by the system, and (iii) functions required to initiate a service provided by the system.

Example 6 is the system of example 5, wherein the memory contains further instructions which, when executed by the processor, cause the processor to determine an execution frequency for one or more functions of the code sequence, calculate an execution frequency threshold, identify as frequent functions of the code sequence the functions with execution frequencies that exceed the execution frequency threshold, and generate the compilation threshold to include the operations corresponding to the frequent functions.

Example 7 is the system of any one of examples 106, wherein the emulation model is further configured to transfer flow information from the emulation model to the compiled operations.

Example 8 is the system of example 7, wherein the flow information includes an emulation instruction pointer of the emulation model.

Example 9 is the system of any one of examples 7 and 8, wherein the flow information is stored in an instruction indicator after being transferred to the compiled operations.

Example 10 is the system of example 9, wherein the instruction indicator is an instruction register of the processor.

Example 11 is the system of any one of examples 7-10, wherein transferring flow information includes providing a location of a subsequent compiled operation for execution within the memory.

Example 12 is the system of any one of examples 1-11, further configured to transfer execution of the operations from the emulation model to the compiled operations when the emulation model completes execution of a function of the code sequence.

Example 13 is the system of any one of examples 1-12, wherein the emulation model is further configured to transfer program execution information from the emulation model to the compiled operations.

Example 14 is the system of any one of examples 1-13, wherein the emulation model is configured to store program execution data in an emulation stack within the memory.

Example 15 is the system of example 14, wherein the program execution information includes an emulation stack pointer of the emulation model, and wherein the emulation stack pointer indicates a location of the emulation stack with the memory.

Example 16 is the system of any one of examples 13-15, wherein the program execution information is stored in a stack indicator after being transferred to the compiled operations.

Example 17 is the system of example 16, wherein the stack indicator is a stack register of the processor.

Example 18 is the system of any one of examples 1-17, wherein the compiled operations are executed in a execution environment configured to: detect that an operation to be executed is uncompiled, and cause the compilation model to compile the operation to be executed into a compiled operation to be executed.

Example 19 is the system of any one of example 1-18, wherein the memory contains further instructions which, when executed, cause the processor to continue compiling the operations using the compilation model after transferring execution of the operations from the emulation model to the compiled operations.

Example 20 is the system of any one of examples 1-19, further configured to transfer execution of the operations from the emulation model to the compiled operations after the compilation model compiles all operations of the code sequence.

Example 21 is the system of any one of examples 1-20, wherein the compilation model is a just-in-time (JIT) compilation model.

Example 22 is the system of example 21, wherein the JIT compilation model includes a JIT model selected from the group consisting of a cached JIT model, a full JIT model, and a hybrid JIT model.

Example 23 is the system of any one of examples 1-22, wherein the operations of the code sequence are stored as bytecodes.

Example 24 is the system of any one of examples 1-23, wherein the processor has multiple threads, and is configured to implement the emulation model and the compilation model in separate threads Example 25 is the system of any one of examples 1-24, wherein the processor and memory are executed within a virtual machine that is implemented by the processor and the memory.

Example 26 is a method comprising receiving a code sequence containing operations for performance by a computing system, executing the operations of the code sequence using an emulation model, and compiling the operations of the code sequence into compiled operations using a compilation model. The method further comprises transferring execution of the operations from the emulation model to the compiled operations and executing the compiled operations.

Example 27 is the method of example 26, further comprising detecting that a current compilation level of the code sequence exceeds a compilation threshold of the code sequence.

Example 28 is the method of any one of examples 26 and 27, wherein the compilation threshold represents a percentage of operations of the code sequence to be compiled into compiled operations before transferring execution of the operations from the emulation model to the compiled operations.

Example 29 is the method of any one of examples 26-28, wherein the compilation threshold represents a predefined subset of the operations of the code sequence to be compiled into compiled operations before transferring execution of the operations from the emulation model to the compiled operations.

Example 30 is the method of example 29, wherein the operations include one or more functions and the predefined subset of the operations is identified as operations representing one or both of (i) functions performed frequently during execution of the code sequence, (ii) functions performed frequently by previously-compiled code sequences performed by the system, and (iii) functions required to initiate a computing system service.

Example 31 is the method of example 30, further comprising determining an execution frequency for one or more functions of the code sequence, calculating an execution frequency threshold, identifying as frequent functions of the code sequence the functions with execution frequencies that exceed the execution frequency threshold, and generating the compilation threshold to include the operations corresponding to the frequent functions.

Example 32 is the method of example 31 further comprising transferring flow information from the emulation model to the compiled operations.

Example 33 is the method of example 32, wherein the flow information includes a location of a subsequent compiled operation for execution within a memory.

Example 34 is the method of example 33, further comprising transferring an emulation instruction pointer of the emulation model to an instruction register of a processor configured to execute the compiled operations.

Example 35 is the method of any one of example 26-35, further comprising transferring program execution information from the emulation model to the compiled operations.

Example 36 is the method of example 35, wherein the program execution information includes an emulation stack pointer of the emulation model that indicates a location of a virtual stack of the emulation model within the memory.

Example 37 is the method of example 35, wherein the program execution information is stored in a stack register of a processor after being transferred to the compiled operations.

Example 38 is the method of any one of examples 26-37, further comprising detecting that an operation to be executed is uncompiled and compiling, with the compilation model, the operation to be executed into a compiled operation to be executed.

Example 39 is the method of any one of examples 26-38, further comprising continuing the compiling of the operations using the compilation model after transferring execution of the operations.

Example 40 is the method of any one of examples 26-39, wherein execution of the operations is transferred after the emulation model completes execution of a function of the code sequence.

Example 41 is the method of any one of examples 26-40, wherein execution of the operations is transferred after the compilation model compiles all operations of the code sequence.

Example 42 is the method of any one of examples 26-41, wherein the compilation model includes a JIT compilation model selected from the group consisting of a cached JIT model, a full JIT model, and a hybrid JIT model.

Example 43 is a method comprising executing a code sequence including operations with an emulation model, compiling operations of the code sequence into compiled operations with a compilation model, and detecting that the compiled operations exceed a compilation threshold of the code sequence. The method also comprises transferring flow information and program execution information from the emulation model to an execution environment and executing the compiled operations within the execution environment.

Example 44 is the method of example 43, wherein the flow information includes a location within a memory, the location storing an operation for execution.

Example 45 is the method of example 44, further comprising generating an emulation instruction pointer upon completing execution of an operation with the emulation model, wherein the emulation instruction pointer includes the location storing the operation for execution. The method also comprises translating the emulation instruction pointer into a translated instruction pointer indicating the location of the compiled operation corresponding to the next operation for execution within the memory and storing the translated instruction pointer in an instruction indicator.

Example 46 is the method of example 45, wherein the location of the next operation for execution is an address within the memory.

Example 47 is the method of any one of examples 45 and 46, further comprising identifying the next compiled operation for execution as the compiled operation compiled from the operation for execution.

Example 48 is the method of any one of examples 43-47, wherein the execution information includes a location of an emulation stack of the emulation model within a memory.

Example 49 is the method of example 48, further comprising generating an emulation stack pointer indicating an emulated location of the emulation stack within the memory, translating the emulation stack pointer into a location of the emulation stack within the memory to create a translated stack pointer, and storing the translated stack pointer in a stack indicator of a processor configured to execute the compiled operations.

Example 50 is the method of example 49, wherein the code sequence includes one or more functions and further comprising detecting a completed execution of a function by the emulation model prior to transferring the flow information and the program execution information.

Example 51 is the method of example 50, wherein detecting the completed execution of a function further comprises detecting the execution of a function break instruction within the emulation model.

Example 52 is a system comprising an emulation means for executing operations of a code sequence, a compilation means for compiling operations of the code sequence into compiled operations, a execution means for executing compiled operations, and a transfer means for transferring execution of the code sequence from the emulation means to the execution means.

Example 53 is the system of example 51, wherein the transfer means is further configured to transfer execution of the code sequence responsive to determining that a compilation level of the compiled operations exceeds a compilation threshold.

Example 54 is the system of any one of examples 52 and 53, wherein the transfer means is configured to transfer one or both of flow information and program execution information from the emulation means to the execution means.

Example 55 is the system of any one of examples 52-54, wherein the flow information includes an emulation instruction pointer of the emulation means.

Example 56 is the system of any one of examples 52-55, wherein the program execution information includes an emulation stack pointer of the emulation means indicating a location of an emulation virtual stack with a memory.

Example 57 is the system of any one of example 52-56, wherein the emulation means and the compilation means operate in parallel.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
a processor implementing a plurality of execution models including (i) an emulation model for executing operations and (ii) a compilation model for compiling operations; and
a memory containing instructions which, when executed by the processor, cause the processor to:
receive a code sequence containing operations for performance by the system;
execute the operations of the code sequence using the emulation model;
compile, in parallel with executing the operations using the emulation model, the operations of the code sequence into compiled operations using the compilation model;
transfer execution of the operations from the emulation model to the compiled operations;
execute the compiled operations; and
continue compiling the operations using the compilation model after transferring execution of the operations from the emulation model to the compiled operations.

2. The system of claim 1, wherein the memory contains further instructions which, when executed by the processor, cause the processor to:
detect that a current compilation level of the code sequence exceeds a compilation threshold of the code sequence.

3. The system of claim 2, wherein the compilation threshold represents a percentage of operations of the code sequence to be compiled into compiled operations before transferring execution of the operations from the emulation model to the compiled operations.

4. The system of claim 2, wherein the operations include one or more functions and the compilation threshold includes operations representing one or more of (i) functions performed frequently during execution of the code sequence, (ii) functions performed frequently by previously-compiled code sequences performed by the system, and (iii) functions required to initiate a service provided by the system.

5. The system of claim 4, wherein the memory contains further instructions which, when executed by the processor, cause the processor to:
determine an execution frequency for one or more functions of the code sequence;
calculate an execution frequency threshold;
identify as frequent functions of the code sequence the functions with execution frequencies that exceed the execution frequency threshold; and
generate the compilation threshold to include the operations corresponding to the frequent functions.

6. The system of claim 1, wherein the emulation model is further configured to transfer flow information from the emulation model to the compiled operations.

7. The system of claim 6, wherein the flow information includes an emulation instruction pointer of the emulation model.

8. The system of claim 6, wherein the flow information is stored in an instruction register of the processor after being transferred to the compiled operations.

9. The system of claim 1, further configured to transfer execution of the operations from the emulation model to the compiled operations when the emulation model completes execution of a function of the code sequence.

10. The system of claim 1, wherein the emulation model is further configured to transfer program execution information from the emulation model to the compiled operations.

11. The system of claim 10, wherein the emulation model is configured to store program execution data in an emulation stack within the memory, and wherein the program execution information includes an emulation stack pointer indicating a location of the emulation stack within the memory.

12. The system of claim 10, wherein the program execution information is stored in a stack register of the processor after being transferred to the compiled operations.

13. The system of claim 1, wherein the compiled operations are executed in a execution environment configured to:
   detect that an operation to be executed is uncompiled; and
   cause the compilation model to compile the operation to be executed into a compiled operation to be executed.

14. The system of claim 1, further configured to transfer execution of the operations from the emulation model to the compiled operations after the compilation model compiles all operations of the code sequence.

15. The system of claim 1, wherein the compilation model is a just-in-time (JIT) compilation model.

16. A method comprising:
   receiving a code sequence containing operations for performance by a computing system;
   executing the operations of the code sequence using an emulation model;
   compiling, in parallel with executing the operations using the emulation model, the operations of the code sequence into compiled operations using a compilation model;
   transferring execution of the operations from the emulation model to the compiled operations;
   executing the compiled operations; and
   continuing to compile the operations using the compilation model after transferring execution of the operations from the emulation model to the compiled operations.

17. A method comprising:
   executing a code sequence including operations with an emulation model;
   compiling, in parallel with executing the operations with the emulation model, operations of the code sequence into compiled operations with a compilation model;
   detecting that the compiled operations exceed a compilation threshold of the code sequence;
   transferring, to an execution environment, (i) an emulation instruction pointer of the emulation model and (ii) an emulation stack pointer identifying an emulation stack of the emulation model, the emulation stack storing program execution information for the code sequence while executed with the emulation model; and
   executing the compiled operations within the execution environment based on the emulation instruction pointer and the emulation stack pointer.

18. The method of claim 17, further comprising continuing to compile the operations using the compilation model after transferring execution of the operations from the emulation model to the compiled operations.

19. The method of claim 17, wherein transferring the emulation instruction pointer of the emulation model further comprises:
   generating the emulation instruction pointer upon completing execution of an operation with the emulation model, wherein the emulation instruction pointer includes a location storing an operation for execution;
   translating the emulation instruction pointer into a translated instruction pointer indicating the location of the compiled operation corresponding to the next operation for execution within a memory; and
   storing the translated instruction pointer in an instruction indicator for the execution environment executing the compiled operations.

20. The method of claim 17, wherein transferring the emulation stack pointer further comprises:
   generating the emulation stack pointer to indicate an emulated location of an emulation stack of the emulation model within a memory;
   translating the emulation stack pointer into a location of the emulation stack within the memory to create a translated stack pointer; and
   storing the translated stack pointer in a stack indicator of a processor configured to execute the compiled operations.

* * * * *